(12) United States Patent
Bank et al.

(10) Patent No.: US 7,986,740 B2
(45) Date of Patent: Jul. 26, 2011

(54) WIRELESS MOBILE COMMUNICATION SYSTEM WITHOUT PILOT SIGNALS

(76) Inventors: Michael Bank, Ashdod (IL); Boris Hill, Holon (IL); Miriam Bank, Jerusalem (IL); Hanit Hill Selecter, Holon (IL)

( * ) Notice: Subject to any disclaimer, the term of this patent is extended or adjusted under 35 U.S.C. 154(b) by 327 days.

(21) Appl. No.: 11/922,896

(22) PCT Filed: Aug. 10, 2006

(86) PCT No.: PCT/IL2006/000926
§ 371 (c)(1),
(2), (4) Date: Dec. 26, 2007

(87) PCT Pub. No.: WO2007/020626
PCT Pub. Date: Feb. 22, 2007

(65) Prior Publication Data
US 2009/0323845 A1    Dec. 31, 2009

(30) Foreign Application Priority Data
Aug. 18, 2005 (IL) .......................................... 170375

(51) Int. Cl.
*H04L 5/12* (2006.01)

(52) U.S. Cl. ........ 375/261; 375/260; 375/259; 375/219; 375/316; 375/295; 370/206; 455/60

(58) Field of Classification Search .................. 375/261, 375/260, 259, 219, 316, 295; 370/206; 455/60
See application file for complete search history.

(56) References Cited

U.S. PATENT DOCUMENTS

| | | | |
|---|---|---|---|
| 5,577,025 A * | 11/1996 | Skinner et al. ................ 370/209 |
| 5,619,524 A * | 4/1997 | Ling et al. ..................... 375/130 |
| 5,691,974 A * | 11/1997 | Zehavi et al. ................. 370/203 |
| 7,133,352 B1 * | 11/2006 | Hadad ............................ 370/208 |
| 2002/0136276 A1 * | 9/2002 | Franceschini et al. ........ 375/148 |
| 2006/0067413 A1 * | 3/2006 | Tsai .............................. 375/260 |

* cited by examiner

*Primary Examiner* — Kenneth Lam

(57) ABSTRACT

Method and system for allowing abandoning pilot signals use and for increasing the immunity to Doppler Effect influence in OFDMA based wireless mobile communication systems and as a result, make them more efficient. This is carried out by transmitting N orthogonal I and Q values of symbols, N times on N frequencies, where N is a power of two. In order to be able to select the desired signal from a mixture of N signals, signs of symbol of each signal vary according to one of N-order Walsh functions.

10 Claims, 18 Drawing Sheets

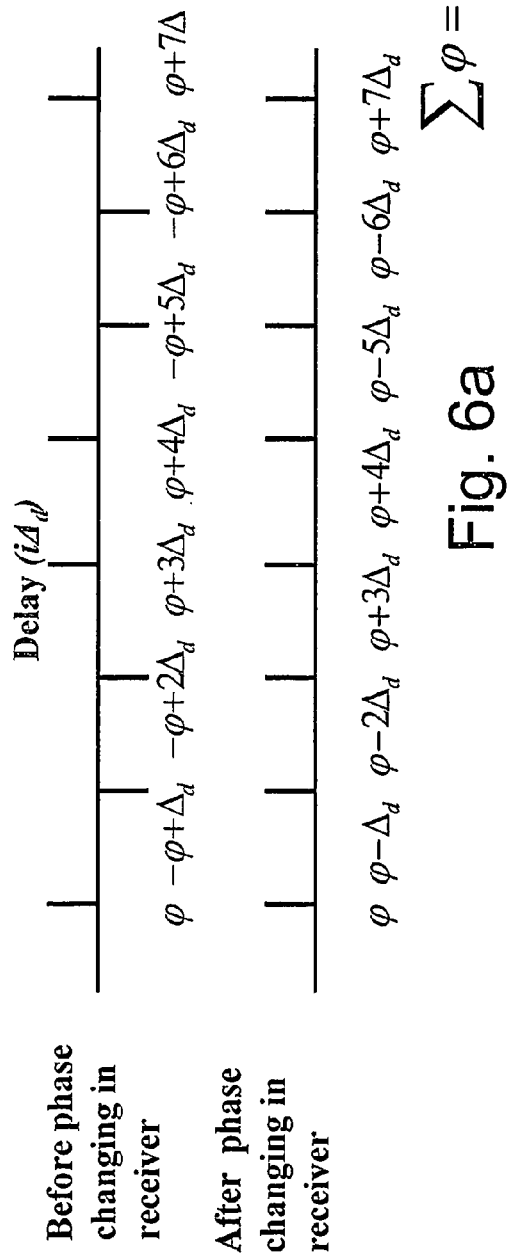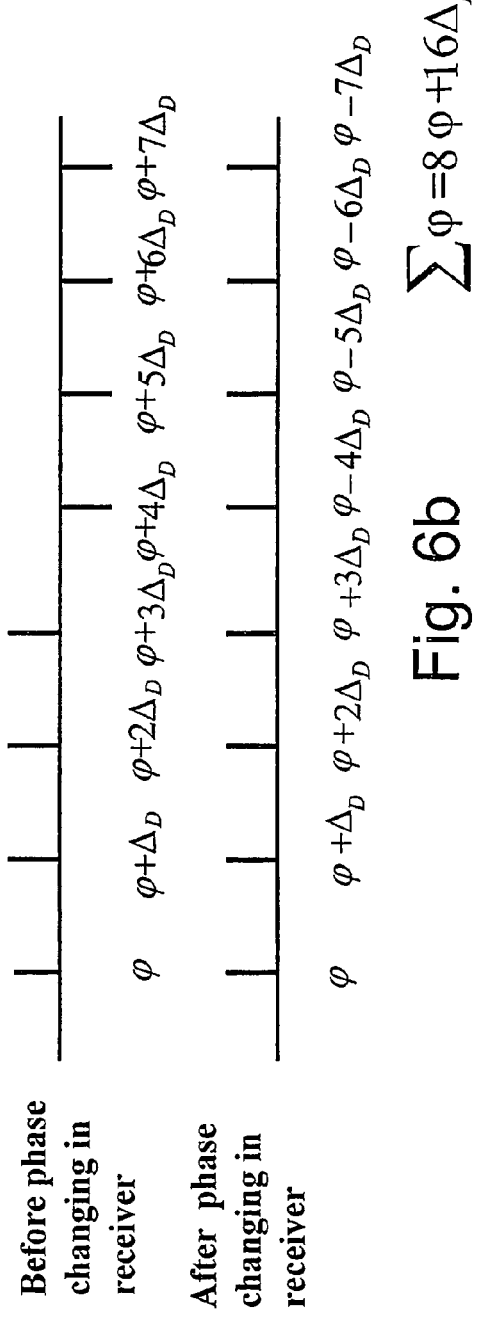
Fig. 6a
Fig. 6b

WIRELESS MOBILE COMMUNICATION SYSTEM WITHOUT PILOT SIGNALS

FIELD OF THE INVENTION

The present invention relates to the field of wireless communication systems. More particularly, the invention relates to a method for canceling the Doppler shift, multi-path propagation delays, and reflection influences of received Radio Frequency (RF) carriers, without using a pilot or test signal.

BACKGROUND OF THE INVENTION

With the growing amount of wireless communications, the need for more communication channels has driven providers to use more frequencies of higher spectrums. However, some of the bearable signal interferences that exist at low frequencies communications increase drastically in higher frequencies, making signal processing more difficult. In some cases the difficulty of signal processing reduces the number of usable communication channels on the allocated frequencies.

One of the interferences in wireless signal processing is caused by the Doppler-shift, which occurs when the transmitter and/or receiver is in motion, like in a moving car. The Doppler-shift causes a shift in frequency of the waves produced during motion of the emitting source relative to the receiver, or during motion of the receiver relative to the emitting source. A shift in these frequencies may alter the processing of the signal, especially if the signal is frequency modulated or phase modulated.

Other difficulties arise from known multi-path propagation delays of wireless signals and normal reflections of the signals themselves, which distort the original signal even further, especially in high frequencies where their impact is more significant. However, a constant delay does not pose a serious problem for the signal processing as long as the delay is consistent; the problem lies with the unpredictable varying delays.

One of the techniques commonly used today to reduce the delays and the Doppler shift uses the help of test signals. These additional test signals are transmitted on some of the allocated communication channels and are spread in preconfigured intervals in the frequency domain and the time domain. By receiving additional test signals the system is able to calculate their delays and deduce these delays from the received signals. However, transmitting additional test signals burdens the allocated frequencies even further, wasting some of the precious communicating channels. Furthermore, these test signals can only estimate the delays of the other signals without conviction, as some of the delays are data driven and some of the signals are not close enough to a test signal in the time and frequency domain.

WO03/003611 discloses a method for improving the utilization of RF communication bands is introduced, where RF signals are combined with a set of orthogonal functions. The method describes how adjacent cells communicate on the same frequencies without interfering one another using the orthogonal property of the signals. The method changes the amplitude of the signal while decoding which is useful only for systems using Phase Shift Key (PSK) or the like modulating systems. However, this publication fails to disclose a method for systems using phase and amplitude coding. Furthermore, it does not disclose a solution for canceling the Doppler-shift, multi-path propagation delay, or reflection interferences without using a test signal.

It is an object of the present invention to provide a method for canceling the Doppler shift, multi-path propagation delays, and reflection influences in wireless communication systems.

It is another object of the present invention to provide a method for canceling delays and shifts of wireless communications without the need for a test or pilot signal and without increasing the number of communication channels.

It is still another object of the present invention to provide a method for wireless communicating based on phase and amplitude modulating methods.

Other objects and advantages of the invention will become apparent as the description proceeds.

SUMMARY OF THE INVENTION

The present invention is directed to a method for canceling the Doppler shift, multi-path propagation, delays, and long time selective fading influences of phase and/or amplitude modulated signals carried by Radio Frequency (RF) sub-carriers, without requirement of pilot signals. The number of $m=2^n$ ($n=1, 2, \ldots,$) orthogonal sub-carriers $f_1, f_2, \ldots, f_m$, over which individual datum is transmitted in each communication channel, is determined. Pairs of Walsh functions are selected from an m×m Walsh-Hadamard matrix, wherein each function is not selected more than once. Each signal is partitioned to its I factor and Q factor whereas $I=A \sin \phi$ of the signal and whereas $Q=A-\cos \phi$ of the signal, and coding each I and Q factors of the signals by the pair functions. A corresponding phase $\phi_i$ and amplitude $A_i$ is allocated for each sub-carrier $f_i$ ($i=1, 2, \ldots, m$), wherein the value of $\phi_i$ and the value of $A_i$ are determined by the data that is transmitted, the digital modulation scheme or inverse spectral transformation, and signs of both corresponding elements taken from the pair Walsh functions. Data is transmitted with the corresponding phases and amplitudes over the sub-carriers. All transmissions carried by said sub-carriers are received and the corresponding phases and amplitudes of all the received signals at frequency $f_i$ are obtained using spectral transformation. The received signals are decoded by changing signs of I and Q factors of the received signals in accordance with corresponding elements from the pair functions, used to decode said signals. The I and Q factors of received signals are summed separately, after changing signs of said I and Q factors of received signals, and each of the summations of I and Q factors is divided by m. The signal is reconstructed using said divided I and Q factors, by calculating its phase whereas $$\varphi = \arctg \frac{I}{Q}$$

and calculating its amplitude whereas $A=\sqrt{I^2+Q^2}$.

The method may further comprise the following steps:
adding predetermined phase to the received signals for shifting the phase and performing the following steps:
decoding said received signals by changing signs of I and Q factors of said received signals in accordance with corresponding elements from the pair functions used to decode said signals;
summing separately said I and Q factors of received signals after changing signs of said I and Q factors of said received signals, and dividing the summation of I and Q factors each by m;

obtaining signal, using said divided I and Q factors, by calculating its phase whereas $$\varphi = \arctg \frac{I}{Q}$$

and calculating its amplitude whereas $A=\sqrt{I^2+Q^2}$;

subtracting said predetermined phase from the received signals and comprising said steps I to III.

comparing results of said signal obtained in claim 1 and from said adding and said subtracting.

adding or subtracting phase from said received signals, if necessary, in accordance with said comparison.

Each selected pair of Walsh functions may add to a symmetric function.

The modulated signals may be phase and amplitude modulated and the modulation method may be QAM. Alternatively, the modulated signals may be phase modulated, and the modulation method may be selected from the group of: BPSK, DBPSK, QPSK, DQPSK, MSK, MPSK, DMPSK. The modulated signals may be amplitude modulated and the modulation method may be ASK.

A guard interval may be added to each symbol before transmission of said symbol, for reducing the effect of transient interference in the receiver. A guard interval may be identified and removed from each symbol. The transmitter and receiver can each be stationary or mobile.

All sub-carrier frequencies of the transmitting signals may be shifting randomly.

The present invention is also directed to a system for canceling the Doppler shift, multi-path propagation delays, and reflection influences from phase and/or amplitude modulated signal, that comprises:

processing means for coding I factor and Q factor of said signal with different Walsh signals, whereas I=A sin φ of said signal and whereas Q=A cos φ of said signal;

transmitting means for transmitting coded signal;

receiving means for receiving said coded signal; and processing means for decoding said I factor and said Q factor of said coded signal;

The system may further comprise:

processing means for determining if the phase of received coded signal has shifted more than a predetermined threshold; and compensation means for shifting phase of received coded signal.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 6a schematically illustrates phase varying delays on a symmetric Walsh signal;

FIG. 6b schematically illustrates phase varying delays on an asymmetric Walsh signal;

DETAILED DESCRIPTION OF PREFERRED EMBODIMENTS

For the sake of brevity some of the terms which are used hereinafter are described explicitly:

TDM and FDM

In order to have a better use of communication channels, several communication systems use multiplexing, whether in the time domain TDM (Time-Division Multiplexed) or in the frequency domain FDM (Frequency-Division Multiplexed). The signals received from different sources are multiplexed together and demultiplexed for transmitting many signals on the same communication channel. Even though in FDM several carriers are transmitted simultaneously, each carrier is modulated independently regardless of other carriers, thus conveying a different source of information. The final transmitted signal is a summation of all the modulated carriers. Nevertheless, two different sources can not utilize the same set of RF carriers due to mutual interference.

Orthogonal Frequency Division Multiplexing (OFDM)

Figure 1:
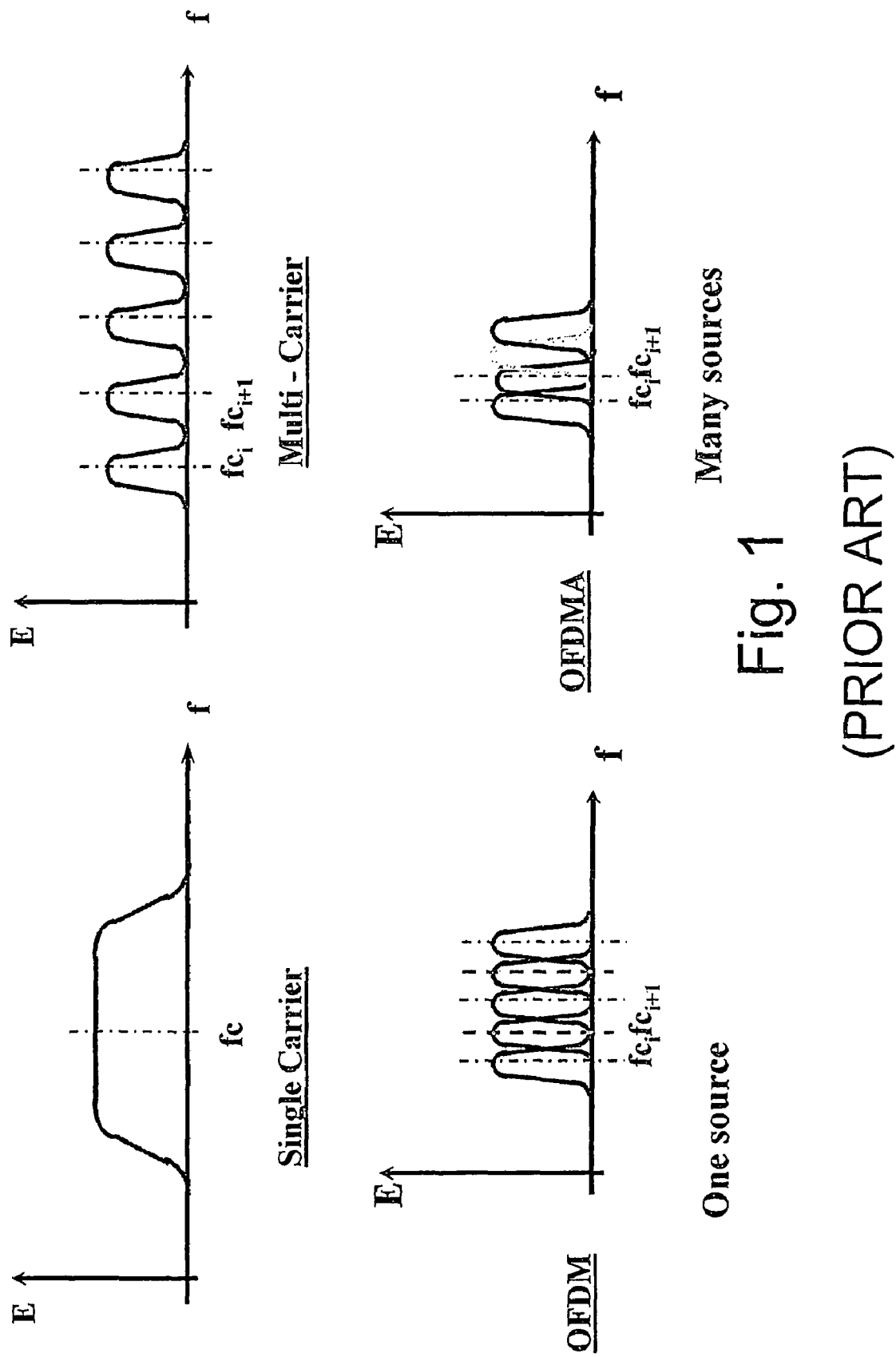
FIG. 1 (prior art) Schematically illustrates different methods of data carrying in the frequency domain.

According to the OFDM technique, a communication channel comprises m orthogonal carriers, and the data to be transmitted is distributed between these carriers, as shown in FIG. 1. This method is widely described and discussed in the professional literature, and currently there are communication systems based on the OFDM method, which has been specified for digital broadcasting systems for both audio and television signals. Using multi-carriers, referred to hereinafter as sub-carriers, according to this technique allows reducing the symbol transmission rate at each carrier, and using the orthogonal property significantly reduces inter-symbol interference. However, the goal of this technique is keeping high symbol/data rate transmission. Therefore, it does not solve the problem of canceling the Doppler shift and other interferences.

Orthogonal Frequency Division Multiple Access (OFDMA)

OFDMA is similar to OFDM in using a communication channel comprising m orthogonal sub-carriers, where the transmitted data is distributed between these carriers. However, in current OFDM systems, only a single source can transmit on all of the sub carriers at any given time, and time division or frequency division multiple access is employed to support multiple sources. OFDMA, on the other hand, allows multiple sources to transmit simultaneously on the different sub carriers per OFDM symbol, as shown in FIG. 1. However, OFDMA does not solve the problem of canceling the Doppler shift and the other interferences.

Sub-Carriers of OFDM and OFDMA Systems

In OFDM and OFDMA based systems, each of the m sub-carriers carries simultaneously (i.e. modulated by) different data. In order to guarantee the absence of inter-symbol interference at the sampling time, and to allow clear separation of the modulation signals of the m sub-carriers in the receiver, the multi-carrier signal satisfies the orthogonal condition $f_s=k*(1/T_s)$, wherein $T_s$ is the duration of the symbol, $f_s$ is the frequency spacing between the sub-carriers in the multi-carrier signal and k is an integer. In other words, the sub-carriers in a multi-carrier signal are uniformly spaced throughout a selected frequency band, and the spacing is inversely related to the symbol duration $T_s$. In order not to waste channel bandwidth, 'k' is chosen to be unity (i.e. k=1).

Walsh Signals

Derived from the rows of the Hadamard matrix the Walsh functions are a number of m binary sequences, where m can be any value which complies with the rule $m=2^n$ (n=1, 2, 3 etc.). The Walsh-Hadamard functions (i.e. vectors) are generated recursively by:

$$H_2^n = \begin{bmatrix} H_n & H_n \\ H_n & H_n' \end{bmatrix} \text{ where } H_1 = [1] \text{ and } H_i' = -H_i$$

Thus, $$H_2 = \begin{bmatrix} 1 & 1 \\ 1 & -1 \end{bmatrix}$$

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} SC_0' \\ SC_1' \\ SC_2' \\ SC_3' \end{bmatrix}$$

up to the desired order m, which is an integer power of 2.

The Walsh functions are orthogonal to each other which imply that the number of agreements and disagreements is equal for each pair of rows in the matrix. Thus, each row (i.e. vector/function) is orthogonal to every other row (zero cross-correlation), and using this property enables to select each row as a Walsh-Hadamard function, which may be used for coding.

Figure 2:
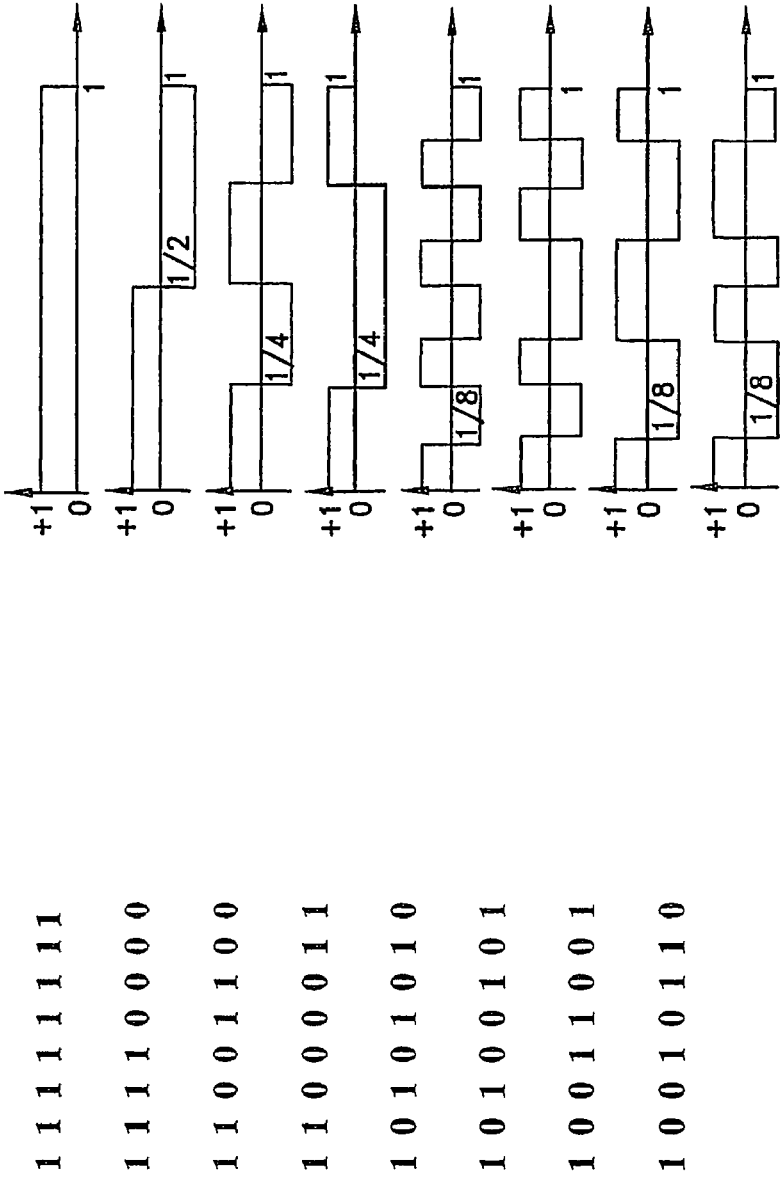
FIG. 2 (prior art) schematically illustrates the Walsh functions and the Walsh signals.

Walsh signals are rectangular waves built on the coding of the orthogonal Walsh functions, which means that any signal is not a sum or difference of any other two signals, as can be seen in FIG. 2, which illustrates Walsh functions of order m=8.

Frequency Bank Signal-1 (FBS-1)

Figure 3:
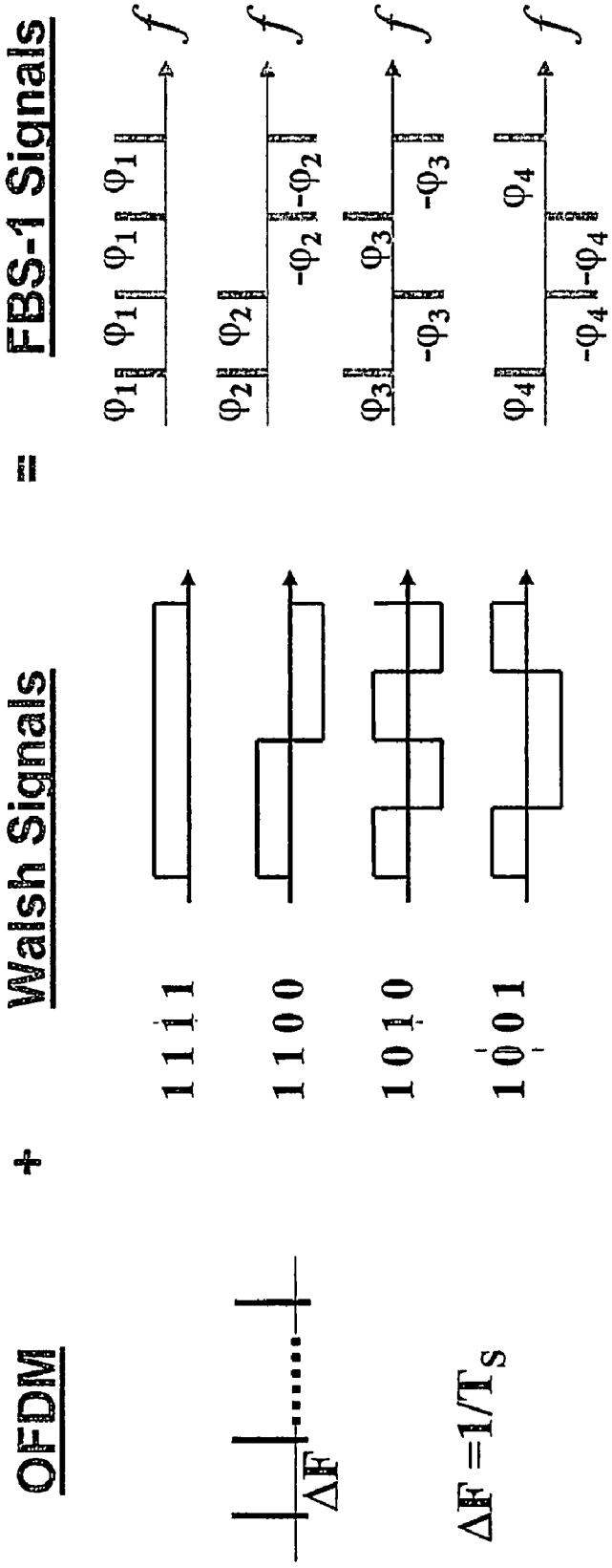
FIG. 3 schematically illustrates the FBS principal.

FBS-1 is introduced in WO03/003611 as the combination of OFDM and Walsh signals, where the sub carriers of the OFDM system carry the orthogonal Walsh signals of any m order simultaneously. In other words, instead of transmitting 1 binary bit of a signal, FBS-1 transmits m bits of signal, corresponding to one of the Walsh signals (for positive bit) or its reverse (for negative bit), as illustrated in FIG. 3. However, since all m Walsh functions are orthogonal, all m Walsh signals may be transmitted simultaneously on the same allocated sub-carriers without interfering or corrupting any of the signals, resulting in the same data transmission rate.

In order to allow better understanding of the principle, a reference is made hereinafter to a simple case wherein data, which should be transmitted is represented by a phase $\phi_i$. Since the same data is transmitted simultaneously by every sub-carrier, the same absolute value of $|\phi_i|$ is allocated to all m sub-carriers, meaning that whenever said data should be transmitted, every sub-carrier is modulated by the same $|\phi_i|$, as illustrated in FIG. 3. The absolute value of $|\phi_i|$ is determined by the data and the digital modulation scheme, and the sign of each $\phi_i$ is selected as to be identical to the sign of a corresponding element taken from a Walsh sequence that corresponds to said signal. Other signals use different Walsh sequences from the same m order, so as to guarantee that all transmissions from other signals are orthogonal to each other.

In contrast to the CDMA systems where a positive value is represented by $\phi_i$ and a negative value is represented by $\phi_i+\pi$, in FBS-1 the positive value is represented by $\phi_i$ and a negative value is represented by $-\phi_i$.

The essence of the FBSA method is allowing the transmission of a number of signals on the same sub-carriers due to the orthogonally traits of the signals as described above.

The FBS-1 signal is represented by the equation $$S_{(kl),FBSA} = E_l \sum_{k=0}^{N-1} e^{j[2\pi f_k t + (-1)^{W_{kl}}(\theta_l + \beta_l)]}$$

where

θl is initial phase. It can be the same for all signals (θl=θ) or various. Different values of θl exclude cases when total amplitude of one cub-carrier will be zero.

Where $E_l$—component magnitude, l=0, ..., N−1

$\theta_l$—initial phase, chosen for certain signal. For example, it is 450 or another value, $\beta_l$—information symbol of the 1 st FBS signal (BPSK or QPSK representation), $f_k=f_0+k\Delta f$—FBS carrier frequencies, k=0, ..., N−1, $W_{kl}$—sequence of phases of the 1 st FBS carrier pattern.

|   | 0 | 1 | 2 | 3 | 4 | 5 | 6 | 7 |
|---|---|---|---|---|---|---|---|---|
| 0 | 2 | 2 | 2 | 2 | 2 | 2 | 2 | 2 |
| 1 | 2 | 2 | 2 | 2 | 1 | 1 | 1 | 1 |
| 2 | 2 | 2 | 1 | 1 | 2 | 2 | 1 | 1 |
| 3 | 2 | 2 | 1 | 1 | 1 | 1 | 2 | 2 |
| 4 | 2 | 1 | 2 | 1 | 2 | 1 | 2 | 1 |
| 5 | 2 | 1 | 2 | 1 | 1 | 2 | 1 | 2 |
| 6 | 2 | 1 | 1 | 2 | 2 | 1 | 1 | 2 |
| 7 | 2 | 1 | 1 | 2 | 1 | 2 | 2 | 1 |

Schemes Combination of FBS-1 Signal

The FBSA invention is characterized by the unique feature of determining the schemes combination ($SC_i$) for each signal. For example, a schemes combination of order m=4 may be $SC_1=\{f_1:+\Psi_1, f_2:+\Psi_1, f_3:-\Psi_1, f_4:-\Psi_1\}$, wherein $f_1$ through $f_4$ are the sub-carriers of a specific signal, which are modulated by positive and negative symbols schemes as specified ($f_1$ and $f_2$ are modulated by positive symbol schemes $+\Psi_1$, while $f_3$ and $f_4$ are modulated by negative symbol schemes $-\Psi_1$). For example if $\Psi_1=-\alpha$ then $-\Psi_1=\alpha$.

Figure 4:
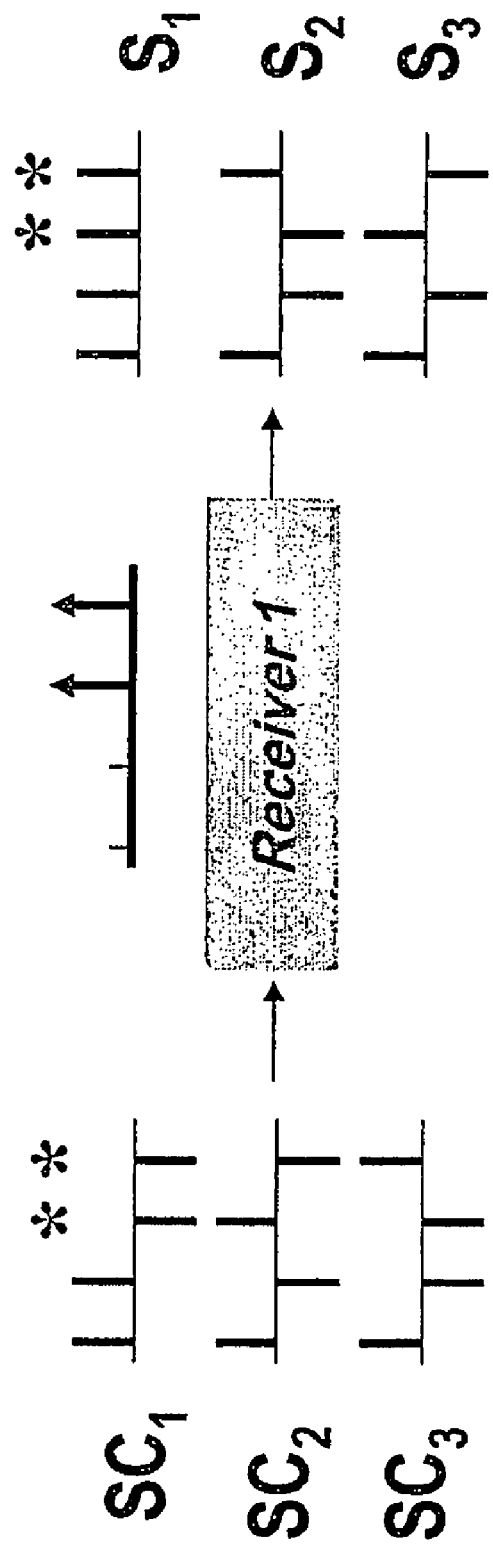
FIG. 4 schematically illustrates the inversion process of the FBS receiver.

In FIG. 4 the three transmission points (the first sequence which consists of all positive signals is not used in mobile systems for practical reasons which will be described later) having a unique $|\Psi_i|$ and the following schemes combination ($SC_i$):

$SC_1=\{f_1:+\Psi_1, f_2:+\Psi_1, f_3:-\Psi_1, f_4:-\Psi_1\}$, for a first transmission point;

$SC_2=\{f_1:+\Psi_2, f_2:-\Psi_2, f_3:+\Psi_2, f_4:-\Psi_2\}$, for a second transmission point; and $SC_3=\{f_1:+\Psi_3, f_2:-\Psi_3, f_3:-\Psi_3, f_4:+\Psi_3\}$, for a third transmission point.

According to the FSBA, the set/group of signals $SC_1$, $SC_2$ and $SC_3$ are chosen in a way that ensures that each signal in this set is orthogonal to every other signal in the set. These orthogonal signals are selected from the known Walsh signals, which are used to generate orthogonal codes.

After selecting the orthogonal codes ($SC_1'$, $SC_2'$ and $SC_3'$), which are in fact the rows of the Hadamard matrix, each symbol scheme $|\Psi_i|$ is multiplied by $SC_i'$. For example, source 1 is assigned a basic symbol scheme $|\Psi_1|$ and a serial/code $SC_1'$ (see matrix $H_4$). Therefore, multiplying $|\Psi_1|$ by $SC_1'$ yields the following schemes combination ($SC_1$):

$$SC_1 = |\Psi_1|*SC_1' = |\Psi_1|*[+1,-1,+1,-1] = [+\Psi_1,-\Psi_1,+\Psi_1,-\Psi_1]$$

sources 2 and 3 are assigned their schemes combinations (i.e. $SC_2$ and $SC_3$) in the same manner, after choosing a different $SC_i'$ code for each source from the remaining orthogonal codes.

It should be noted that in cases where more than four sub-carriers are to be used and/or more than three sources utilize the same set of sub-carriers, a Walsh-Hadamard matrix of higher order should be used, in order to generate more orthogonal codes to choose from.

Inversion of Phases at a Receiver

In order to allow a receiver to selectively receive a signal that is transmitted from a specific source, the receiver is programmed to change the sign(s) of negative schemes of the sub-carriers in the selected composite carrier, as shown in FIG. 4. For example, if a signal from source 1 is to be received, of which composite signal comprises the schemes combination $SC_1=\{f_1:+\Psi_1, f_2:+\Psi_1, f_3:-\Psi_1, f_4:-\Psi_1\}$, the receiver is programmed to change the sign of the phases of $f_3$ and $f_4$, thus receiving a positive combination $S_1=\{f_1:+\Psi_1, f_2:+\Psi_1, f_3:+\Psi_1, f_4:+\Psi_1\}$. It should be noted that the sign of the phases of $f_3$ and $f_4$ that are received from other adjacent sources, are also changed. However, by virtue of the orthogonal codes, the effects of other sources are eliminated. For example, source 2 comprises the schemes combination $SC_2=\{f_1:+\Psi_2, f_2:-\Psi_2, f_3:+\Psi_2, f_4:-\Psi_2\}$ which the receiver is programmed to change the sign of the phases of $f_3$ and $f_4$, thus receiving an eliminated $S_2=\{f_1:+\Psi_3, f_2:-\Psi_3, f_3:-\Psi_3, f_4:+\Psi_3\}$ where $$\sum_{S_2} \Psi_i = 0.$$

According to one of the embodiments of the FBSA, a basic system comprises four orthogonal serials/codes of m=4 (i.e. $SC_i$, i=0, 1, 2, 3). However, since the first serial/code $SC_0'=[1, 1, 1, 1]$ is impractical since there is no need to implement the inversion rule, only three orthogonal codes are available (i.e. $SC_1'$, $SC_2'$ and $SC_3'$). As shown in FIG. 4, three sources transmit on the same four sub-carriers different Walsh sequences.

Summation of the Phases

As a result of the above-mentioned inversion process (i.e. changing the sign of phases), the receiver has three sets of modified carriers, one of which is a set of 'all positive' symbol schemes, belonging to the selected transmission source, and the other two sets of symbol schemes, belonging to the adjacent/interfering sources, each one having equal positive and negative phase schemes.

After the completion of the inversion process, the receiver sums-up the 'phase contribution' of every sub-carrier, from every adjacent transmission source. Assuming, for example, that there are three sources, in which each multi-carrier comprises m=4 sub-carriers, each one of the sub-carrier has therefore three phases contributions. For example, sub-carrier $f_1$ contributes (to the summation) $+\Psi_1$ from $S_1$, $+\Psi_2$ from $S_2$ and $-\Psi_3$ from $S_3$. Similarly, $f_1$ through $f_4$ contribute their respective phases.

At the end of the summation process, only the sub-carriers of the selected signal remain to be further processed (de-modulated), while other signals cancel out each other. Since the selected composite carrier comprises sub-carriers that are modulated by similar data, the data can be extracted from either one of the sub-carriers. The data extraction is relatively easy, because, as is mentioned before, the sub-carriers in the multi-carrier signal are orthogonal, which allows clear separation of the modulation signals of the sub-carriers in the receiver.

In FIG. 4 an $S_1$ receiver receives all SC's transmissions carried by all sub-carriers and obtains, by summing the corresponding phases, the total phase $\Phi_i$ of all the received signals at frequency $f_i$. The receiver then changes the sign of the total phase $\Phi_i$ for all i values that correspond to negative elements in the corresponding row. Finally, the phase $\phi_i$ is obtained in the receiver, by summing the values of the total phase $\Phi_i$, after changing phase sign, and dividing the result of the summation by a number determined according to m and/or the ratio between the magnitudes of the sub-carriers and the sub-carriers of other signals.

Phase Compensation in FBS-1

Figure 5:
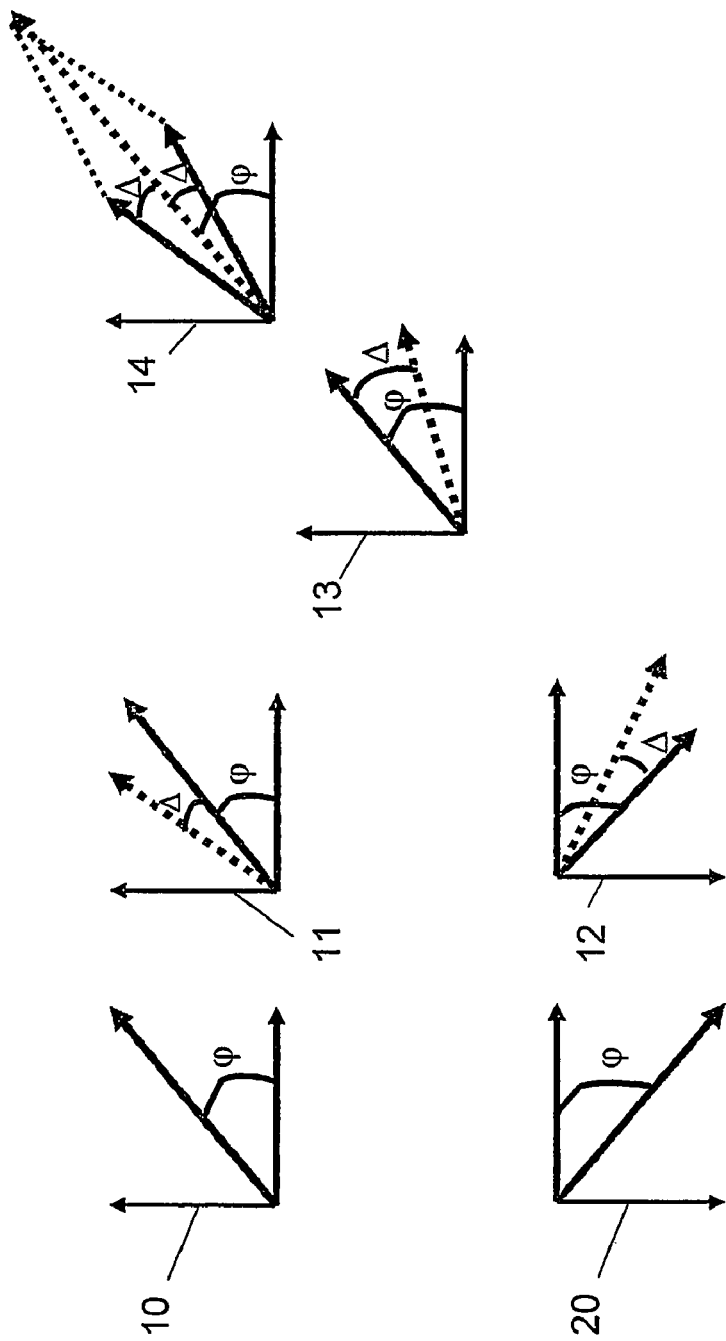
FIG. 5 schematically illustrates the phase distortion compensation of the FBS method.

One of the main advantages of FBS-1 is the phase shift compensation resulting from the inversion process (i.e. changing the sign of phases) described above. In order to allow better understanding of the principle, a reference is made to a simple case where a positive phase signal ($\phi$) is received together with a negative phase signal ($-\phi$) as illustrated in FIG. 5 graphs 10 and 20, respectively. Due to phase shift, both phases have shifted uniformly in the same direction, counter clockwise, from their initial phase as shown in graphs 11 and 12, respectively. The negative phase signal is thus inversed in the receiver, forming graph 13, and summed with the positive phase in graph 14. The angle summation of positive and negative phase is calculated and divided by 2, resulting in the initial phase. Since Walsh signals of any order have an equal number of positive and negative phases the calculations of the total summation are essentially the same as described.

Deficiencies of FBS-1

One of the problems of signal processing is variations in the delay or in the phase shift of the signal. Even though, FBSA system is capable of compensating a constant delay as described before, a varying delay that changes with time should be compensated. The system for decoding in FBSA is capable of eliminating continuing phase shift in symmetrical signals as shown in FIG. 6a. As may be understood by a person skilled in the art, $\Delta_D$ can represent a Doppler shift, reflection interference, or any other continuing delay of the signal. As shown, after a phase change, the delay is cancelled out in a symmetrical signal. However, FIG. 6b shows the contrary in an asymmetrical Walsh function being inversed by an FBS-1 system while the delay accumulates and interferes with the signal processing. Because of its asymmetrical form, the accumulating delay is not canceled by the inversed delay.

Another problem concerning the FBS-1 system involves the distortion of the amplitude during phase compensation. Because phase compensation method of the FBS-1 uses the summation of the positive (φ) signal and the negative (−φ) signal, the amplitude of the combined signal differs from the initial amplitude, as illustrated in FIG. 5. Therefore, amplitude based coding systems such as AM (Amplitude Modulation) or QAM (Quadrate Amplitude Modulation) systems cannot be used by FBS-1.

Frequency Bank Signal-2 (FBS-2)

The core of this invention is the FBS-2 which is an improvement of the FBSA described before. FBS-2 is similar to FBS-1 in using OFDM sub-carriers and Walsh Functions to decode signals. However, in FBS-1 each signal is coded with a Walsh function, transmitted, and decoded by the corresponding decoder using the appropriate inversion process. In FBS-2, each signal is separated to two factors I and Q wherein: I=A sin φ of the original signal, and Q=A cos φ of the original signal. Each factor is coded separately with a Walsh function of order m, resulting in m signals of |I| and m signals of |Q|. Each coded signal of |I| is thus combined with its coded counterpart of |Q| to form a single signal for transmitting: A cos (ωt+φ)=Q cos ωt+I sin ωt, resulting in m signals of A cos (ωt+φ) wherein each signal is transmitted using a different sub-carrier. Upon receiving all m signals the transmitter utilizes the inversion process on the I factor and Q factor of the signals, separately, each according to the specific decoder of the Walsh function used for decoding. In other words, each signal received on a sub-carrier may have its I factor inversed, or its Q factor inversed, or both of its factors inversed, or none of the factors inversed, depending on the decoders of the Walsh functions used to decode the original signal. After the inversion process is completed, all the I and Q factors of the outcome signals are added separately and divided by m separately. At this point, the divided total of added I factors and the divided total of added Q factors are combined to reconstruct the amplitude and phase of the original signal utilizing the following functions:

$$A = \sqrt{I^2 + Q^2};$$

$$\varphi = \text{arc}tg\frac{I}{Q}$$

Necessity of Choosing Combinations of Walsh Functions for FBS-2

As described above, each carrier signal in FBS-2 is separated into two factors I and Q wherein: I=A sin φ, Q=A cos φ, and each factor is combined separately with a Walsh function. However, only certain pair combinations of Walsh signals are capable of producing the sought outcome of canceling the Doppler shift and the delays described above. Each pair of Walsh signals should add up to a symmetric signal, and each Walsh function can be used only once. The explanation and mathematical discussion of these restrictions will follow further on.

In one of the embodiments, a simple combination of FBS-2 with m=8 is used where the Walsh function used is from the Hadamard matrix of order m=8:

$$H_8 = \begin{bmatrix} 1 & 1 & 1 & 1 & 1 & 1 & 1 & 1 \\ 1 & -1 & -1 & 1 & -1 & 1 & 1 & -1 \\ 1 & -1 & -1 & 1 & 1 & -1 & -1 & 1 \\ 1 & 1 & 1 & 1 & -1 & -1 & -1 & -1 \\ 1 & 1 & -1 & -1 & -1 & -1 & 1 & 1 \\ 1 & -1 & 1 & -1 & -1 & 1 & -1 & 1 \\ 1 & -1 & 1 & -1 & 1 & -1 & 1 & -1 \\ 1 & 1 & -1 & -1 & 1 & 1 & -1 & -1 \end{bmatrix} = \begin{bmatrix} SC'_0 \\ SC'_1 \\ SC'_2 \\ SC'_3 \\ SC'_4 \\ SC'_5 \\ SC'_6 \\ SC'_7 \end{bmatrix}$$

Since the first serial $SC_0'=[1, 1, 1, 1, 1, 1, 1, 1]$ is impractical for mobile systems (i.e. there is no need to implement the inversion rule), only seven orthogonal serials are available from the order of m=8, where only three couples can be chosen for conveying the signal. As stated before, each couple of Walsh signals should combine to a symmetric signal and each Walsh signal can be used only once. As may be understood by a person skilled in the art, more than one combination of pairs fulfilling these restrictions is possible. For example, three couples producing a summation which is symmetric, as shown (Table 1):

| First couple: | Second couple: | Third couple: |
|---|---|---|
| 1 −1 −1 1 −1 1 1 −1 | 1 1 −1 −1 −1 −1 1 1 | 1 1 1 1 −1 −1 −1 −1 |
| 1 −1 1 −1 1 −1 1 −1 | 1 −1 1 −1 −1 1 −1 1 | 1 1 −1 −1 1 1 −1 −1 |
| + + − − − − + + | + − − + + − − + | + + − − − − + + |

Choosing Walsh Functions for Stationary Communication

In order to better exploit the allocated channels the pair of Walsh functions containing the Walsh signal comprised of 1's may be used for stationary communication. Since stationary communication does not suffer from the Doppler shift affect, there is no need to use the inversion process, which allows the use of a signal comprised of 1's.

Implications of Delays and Phase Shift

The following equations will prove that the delay in the first signal of the first pair in Table 1 does not interfere with its counterpart signal, the second signal of the first pair. As understood, each signal of each pair may belong to I or Q, as long as each pair has a known signal for I and a known signal for Q. The mathematical proof is legible for the reverse possibility as well, and can be applied to the other pairs.

Figure 7:
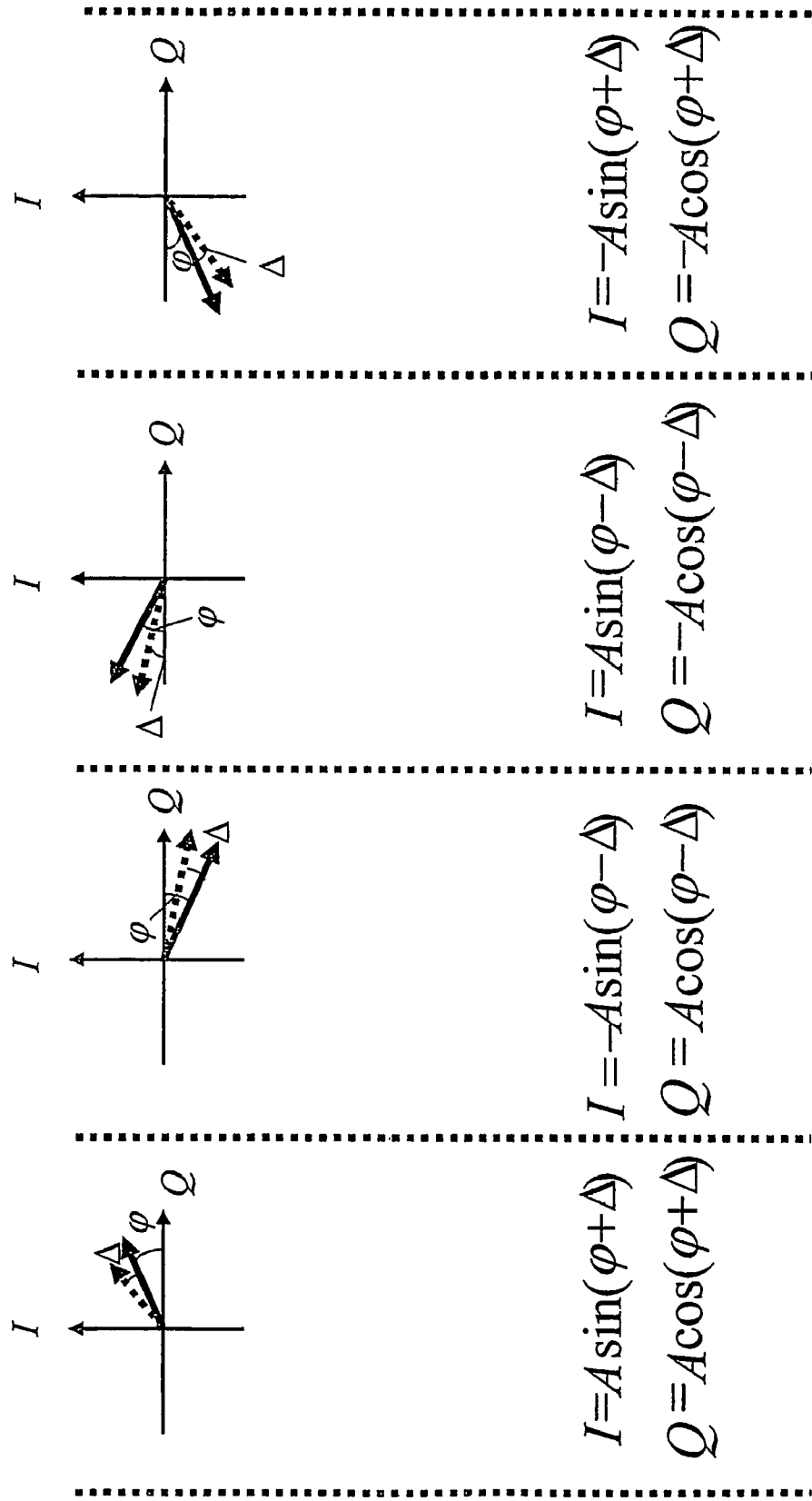
FIG. 7 schematically illustrates angle combinations with possible phase shifts of a modulation method.

To simplify matters, all possible I/Q combinations are one of the following: +1/+1, −1/+1, +1/−1, −1/−1, resulting in 4 possible carrier pairs:

$I=A \sin(\phi) I=-A \sin(\phi) I=A \sin(\phi) I=-A \sin(\phi)$ $Q=A \cos(\phi) Q=A \cos(\phi) Q=-A \cos(\phi) Q=-A \cos(\phi)$ In FIG. 7, all possible I/Q combinations with phase shifts are illustrated together with the mathematical implication of each shift. As may be understood by a person skilled in the art, although all the phase shifts shown are in the same counter-clockwise direction, the same calculations can be used for the clockwise phase shifts. When implementing the phase shifts of FIG. 7 on the first couple of Walsh functions depict in Table 1, we obtain the following signals (e.g. equations):

$I=A \sin(\phi+\Delta) I=-A \sin(\phi+\Delta) I=-A \sin(\phi-\Delta) I=A \sin(\phi-\Delta)$ $Q=A \cos(\phi+\Delta) Q=-A \cos(\phi+\Delta) Q=A \cos(\phi-\Delta) Q=-A \cos(\phi-\Delta)$ $I=-A\sin(\phi-\Delta)I=A\sin(\phi-\Delta)I=A\sin(\phi+\Delta)I=-A\sin(\phi+\Delta)$ $Q=A\cos(\phi-\Delta)Q=-A\cos(\phi-\Delta)Q=A\cos(\phi+\Delta)Q=-A\cos(\phi+\Delta)$ After applying the inversion process corresponding to the first pair of Walsh signals we obtain:

$I=A\sin(\phi+\Delta)I=A\sin(\phi+\Delta)I=A\sin(\phi-\Delta)I=A\sin(\phi-\Delta)$ $Q=A\cos(\phi+\Delta)Q=A\cos(\phi+\Delta)Q=A\cos(\phi-\Delta)Q=A\cos(\phi-\Delta)$ $I=A\sin(\phi-\Delta)I=A\sin(\phi-\Delta)I=A\sin(\phi+\Delta)I=A\sin(\phi+\Delta)$ $Q=A\cos(\phi-\Delta)Q=A\cos(\phi-\Delta)Q=A\cos(\phi+\Delta)Q=A\cos(\phi+\Delta)$ Summing all the equations of I separately and Q separately reveals:

$\Sigma I_\Delta = 4A[\sin(\phi+\Delta)+\sin(\phi-\Delta)]$ $\Sigma Q_\Delta = 4A[\cos(\phi+\Delta)+\cos(\phi-\Delta)]$ Calculating the implications of the delay discovered above.

$$\sin(\varphi+\Delta)+\sin(\varphi-\Delta) = \sin\varphi\cos\Delta + \cos\varphi\sin\Delta + \sin\varphi\cos\Delta - \cos\varphi\sin\Delta =$$
$$= 2\sin\varphi\cos\Delta$$

$$\cos(\varphi+\Delta)+\cos(\varphi-\Delta) = \cos\varphi\cos\Delta - \sin\varphi\sin\Delta + \cos\varphi\cos\Delta + \sin\varphi\sin\Delta =$$
$$= 2\cos\varphi\cos\Delta$$

Proving that the delay has no affect on the outcome of $\phi$:

$$\frac{\sum I_\Delta}{\sum Q_\Delta} = \frac{8A\sin\varphi\cos\Delta}{8A\cos\varphi\cos\Delta} = tg\varphi$$

Until now the equations have proved that the phase shifts and delays of a pair I and Q do not interfere in the reconstruction of the original signal. The following equations will prove that the phase shift and delay of one pair does not interfere with the signal processing of another pair due to the orthogonally trait and the inverse process.

Multiplying the first pair after phase shift with the inversion process of the second pair reveals:

$I=A\sin(\phi+\Delta)I=-A\sin(\phi+\Delta)I=A\sin(\phi-\Delta)I=-A\sin(\phi-\Delta)$ $Q=A\cos(\phi+\Delta)Q=A\cos(\phi+\Delta)Q=A\cos(\phi-\Delta)Q=A\cos(\phi-\Delta A)$ $I=A\sin(\phi-\Delta)I=-A\sin(\phi-\Delta)I=A\sin(\phi+\Delta)I=-A\sin(\phi+\Delta)$ $Q=-A\cos(\phi-\Delta)Q=-A\cos(\phi-\Delta)Q=-A\cos(\phi+\Delta)Q=-A\cos(\phi+\Delta)$ Once again Summing all the equations of I separately and Q separately reveals that the delays cancel one another:

$\Sigma I_\Delta = 0$ $\Sigma Q_\Delta = 0$

Mathematical Discussion

As stated before any one of the Walsh functions can be used only once either for I or for Q in the same vicinity (i.e. cell) for canceling the Doppler shift. In order to confirm this assumption, a reference is made to a case where two pairs of Walsh functions share the same function (Table 2):

| First couple: | Second couple: |
|---|---|
| 1 −1 −1 1 −1 1 1 −1 | 1 1 −1 −1 −1 −1 1 1 1 |
| 1 −1 1 1 −1 1 −1 −1 | 1 −1 −1 1 −1 1 1 −1 |

After implementing the phase shifts of FIG. 7, as described above, in the first pair of Walsh functions we receive the following equations:

$I=A\sin(\phi+\Delta)I=-A\sin(\phi+\Delta)I=-A\sin(\phi-\Delta)I=A\sin(\phi-\Delta)$ $Q=A\cos(\phi+\Delta)Q=-A\cos(\phi+\Delta)Q=A\cos(\phi-\Delta)Q=-A\cos(\phi-\Delta)$ $I=-A\sin(\phi-\Delta)I=A\sin(\phi-\Delta)I=A\sin(\phi+\Delta)I=-A\sin(\phi+\Delta)$ $Q=A\cos(\phi-\Delta)Q=-A\cos(\phi-\Delta)Q=A\cos(\phi+\Delta)Q=-A\cos(\phi+\Delta)$ After applying the inversion process of the second pair we receive:

$I=A\sin(\phi+\Delta)I=-A\sin(\phi+\Delta)I=A\sin(\phi-\Delta)I=-A\sin(\phi-\Delta)$ $Q=A\cos(\phi+\Delta)Q=A\cos(\phi+\Delta)Q=-A\cos(\phi-\Delta)Q=-A\cos(\phi-\Delta)$ $I=A\sin(\phi-\Delta)I=-A\sin(\phi-\Delta)I=A\sin(\phi+\Delta)I=-A\sin(\phi+\Delta)$ $Q=-A\cos(\phi-\Delta)Q=-A\cos(\phi-\Delta)Q=A\cos(\phi+\Delta)Q=A\cos(\phi+\Delta)$ Summing all the equations of I separately and Q separately reveals:

$\Sigma I_\Delta = 0$ $\Sigma Q_\Delta = 4A\cos(\phi+\Delta) - 4A\cos(\phi-\Delta)$ As can be seen, phase shift of the first couple interferes with the signal processing of the second couple. Therefore, each Walsh function can be used only once in the same vicinity (i.e. cell) for canceling the Doppler shift, without acquiring more interferences.

Method for Choosing Pairs of Walsh Functions

As mentioned above, any pair combination of Walsh signals that adds up to a symmetric signal, and where each Walsh function is used only once, may be applied in the FBS-2. Furthermore, many combinations that fulfill these restrictions are possible in some of the Walsh signals of order m. Nevertheless, a method will be introduced shortly for easily finding some of the possible combinations of pairs for each order of m.

Figure 8:
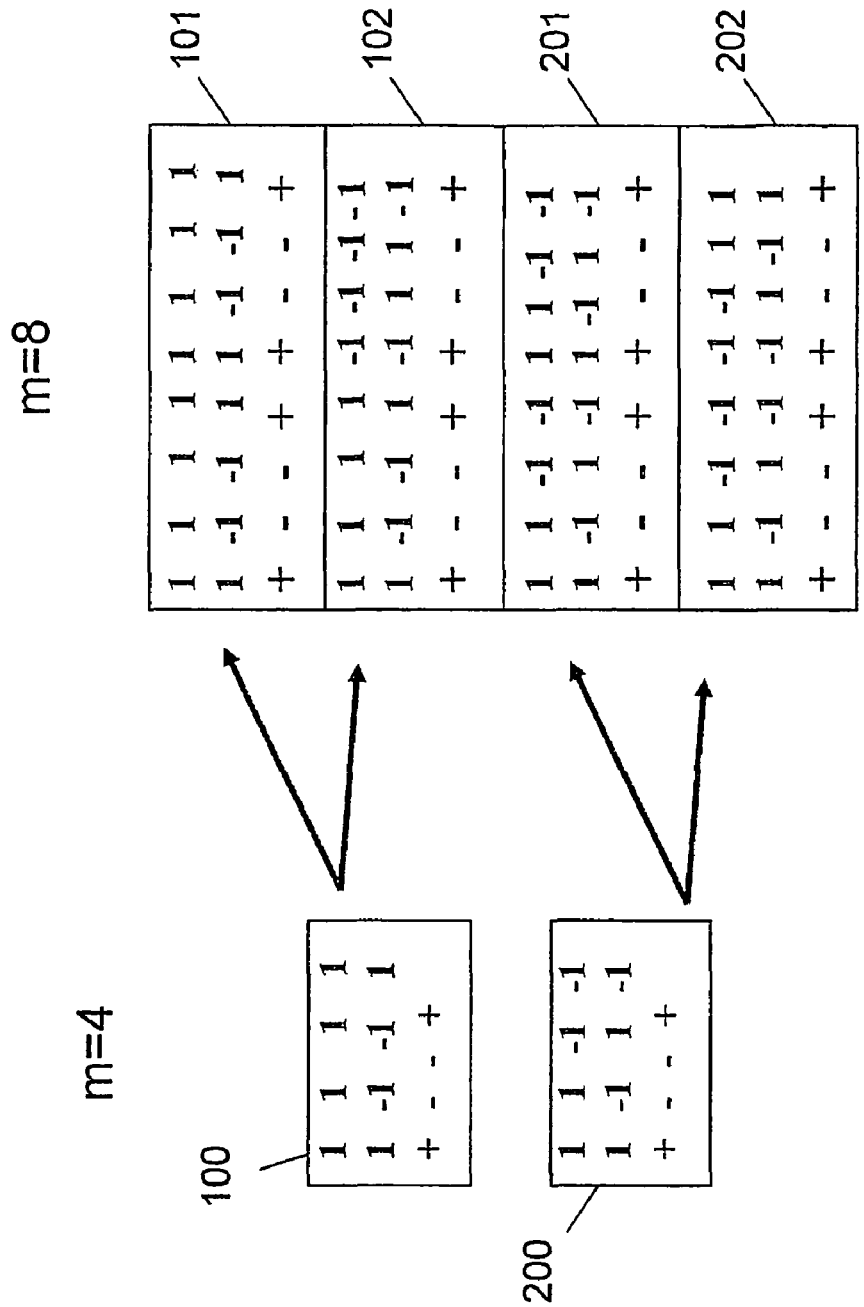
FIG. 8 illustrates a method for finding pairs of Walsh functions of order m=8.

In FIG. 8 a basic set of two pairs of Walsh functions of the order m=4 that add up to a symmetric signal is shown in blocks 100 and 200. In order to construct the Walsh functions of the order m=8 that add up to a symmetric signal each pair is copied twice, once with the identical pair appended, and once with the negative of the pair appended as shown in blocks 101, 102, 201 and 202 and which comply with the rule (Table 3):

| M = $2^n$ | M = $2^{n+1}$ | M = $2^{n+2}$ |
|---|---|---|
| A | A A | A A A A |
|   |   | A A –A –A |
| B | B B | B B B B |
|   |   | B B –B –B |
|   | A –A | A –A A –A |
|   |   | A –A –A A |
|   | B –B | B –B B –B |
|   |   | B –B –B B |

Compensation for Phase Shifts Larger than π/2

As described before, FBS-2 is able to cancel phase shifts by applying the inverse process, summing all the signals and their inversions, and dividing the total summation of the signals and their inversions by m, without the aid of a pilot or test signal. However, if the phase shift accumulates over time and passes π/2, summing and dividing of all signals results in the opposite phase of φ+π, 180° away from the original phase. Therefore, the process proposed by the present invention includes another unique feature, which allows it to detect when the phase has been shifted by more than a certain threshold, and deduces that threshold from the phase of the received signal. It should be noted that the phase threshold can be determined arbitrarily or depending on the needs and requirements of the system.

Figure 9A:
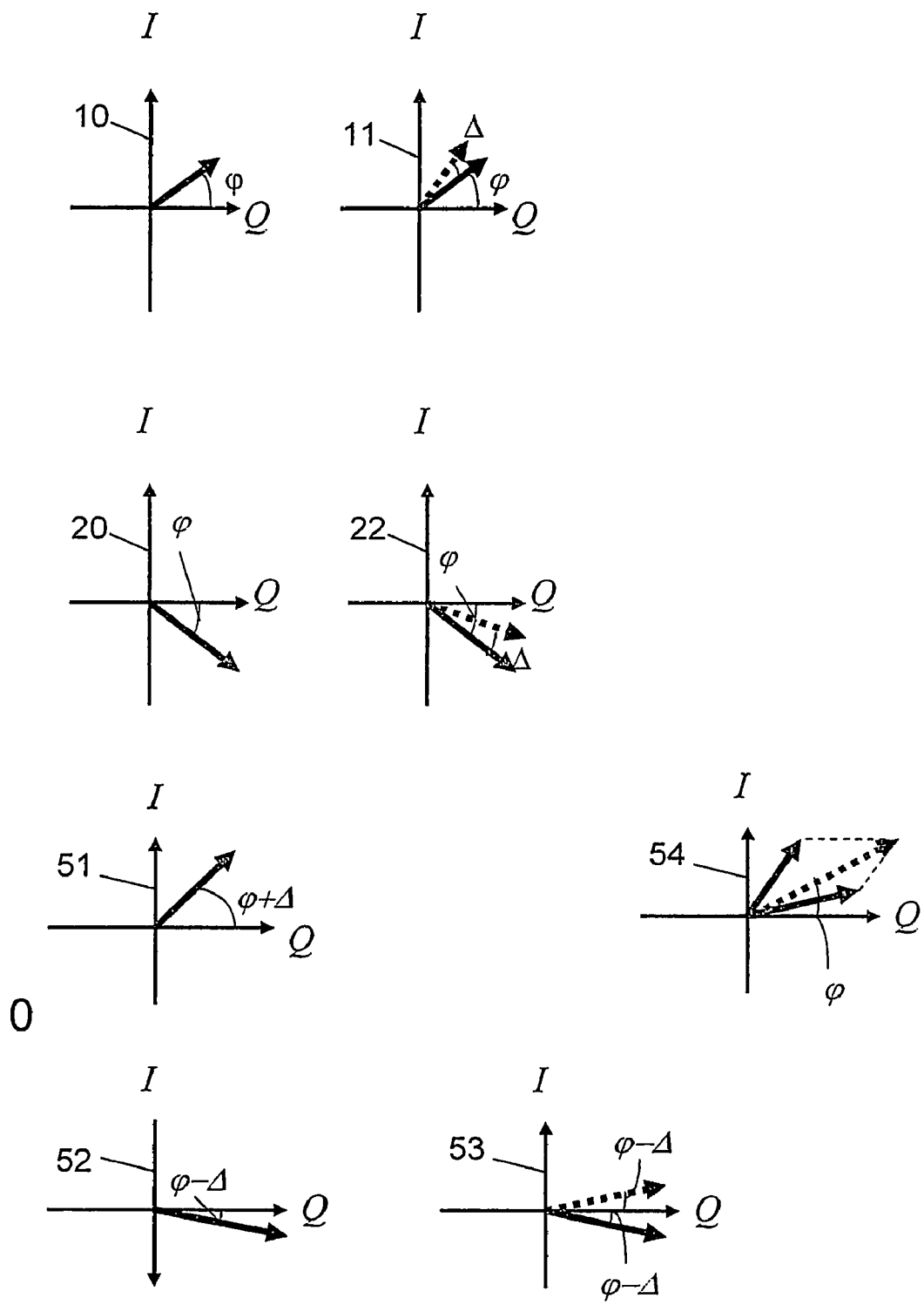
FIG. 9A schematically illustrates angles of received signals processed by FBSB system.
Figure 9A:
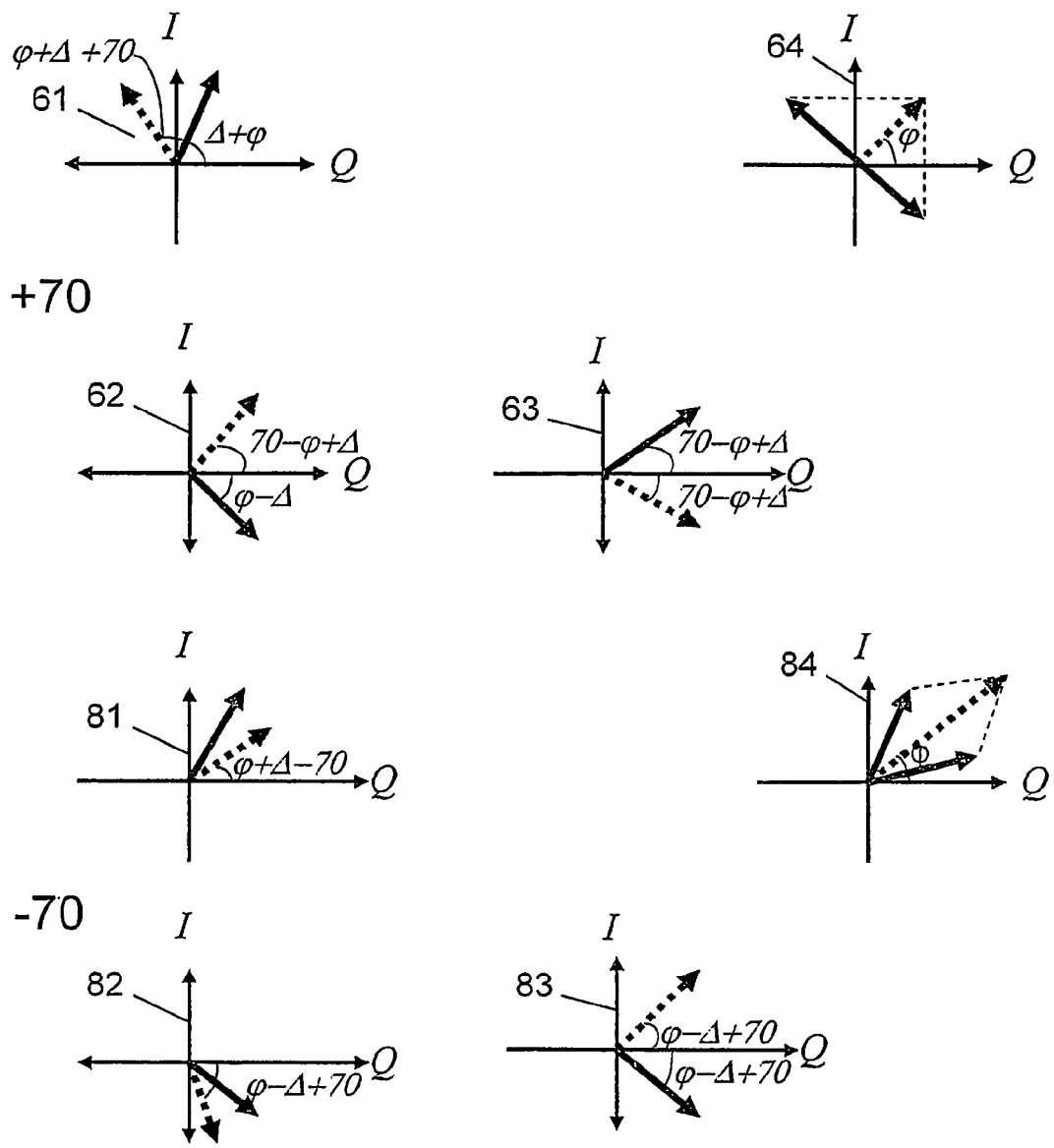
Figure 9B:
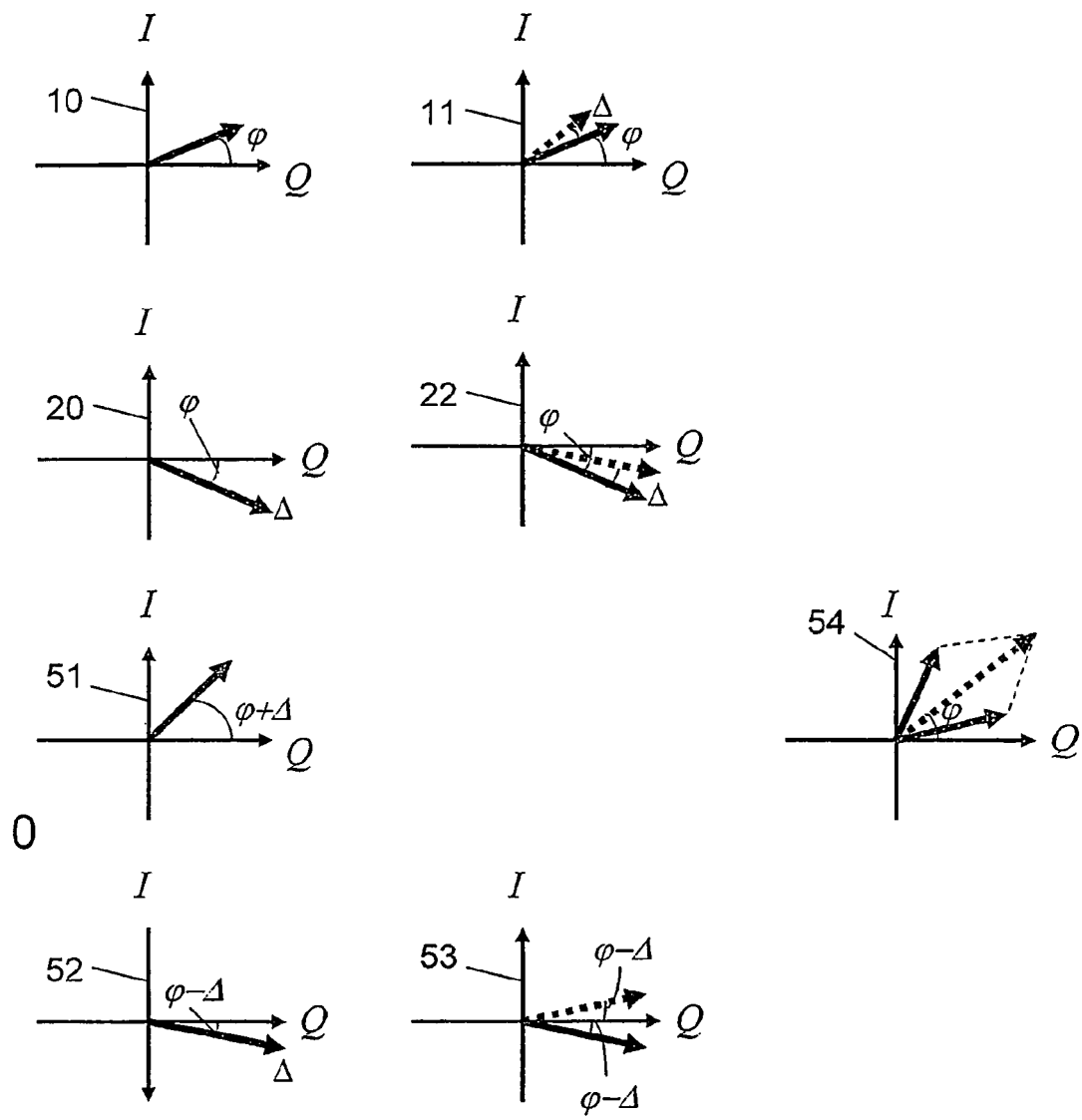
FIG. 9B schematically illustrates angles of received signals processed by FBSB system.
Figure 9B:
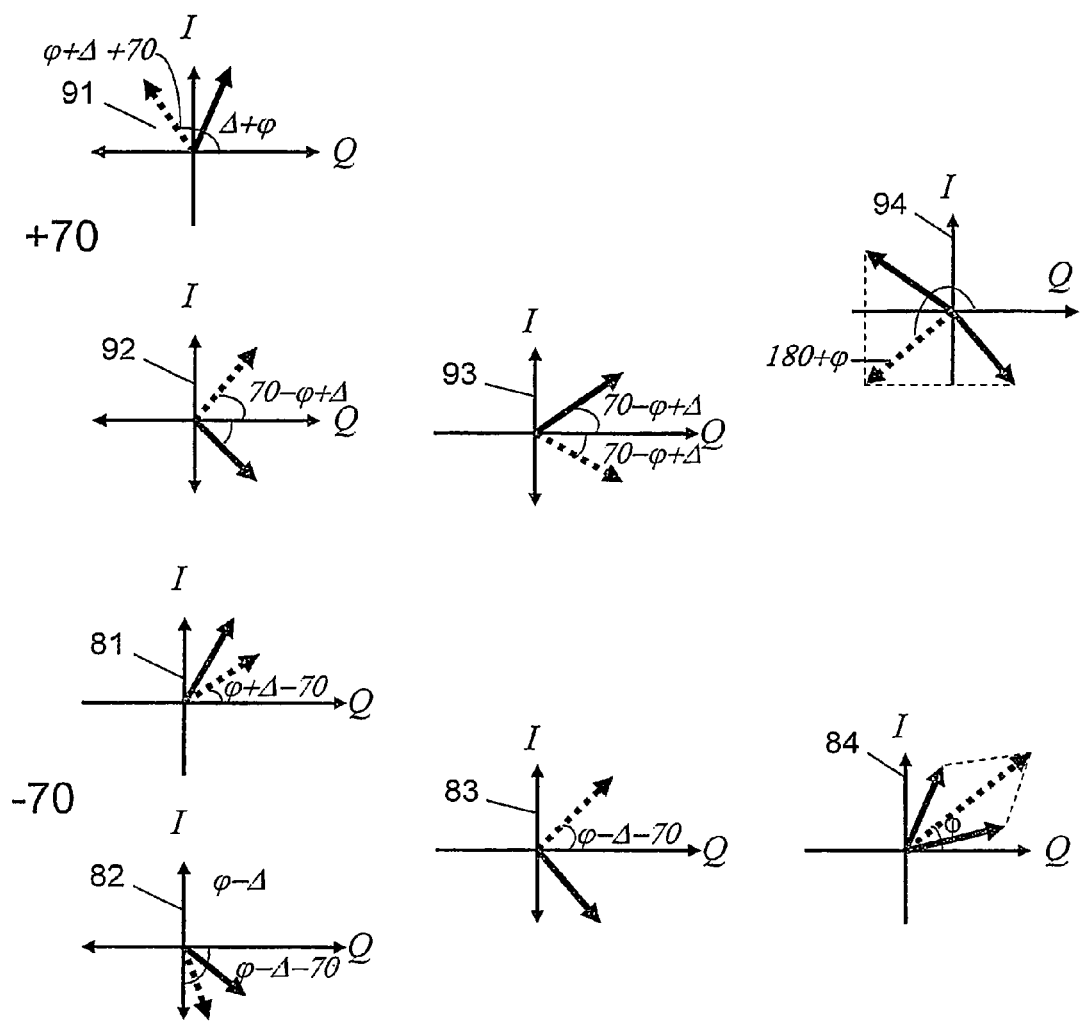

In order to allow better understanding of the proposed principle, an example is described, where the determined threshold is 20°, and a reference is made hereinafter to a simple case, where a positive phase signal (φ) is obtained together with a negative phase signal (–φ), as illustrated in FIG. 9a and FIG. 9b graphs 10 and 20, respectively. Due to phase shift, both phases have shifted uniformly in the same direction from their initial phase, as shown in graphs 11 and 22. However, FIG. 9a depicts a phase shift smaller than the threshold where Δ<20°, whereas FIG. 9b depicts a phase shift greater than the threshold where Δ>20°. In FIG. 9a graphs 51 and 52 illustrate two received phases with a phase shift identical to graphs 11 and 22 respectively. As described above, in the phase compensation process, the negative phase signal of graph 52 is inversed in the receiver forming graph 53 and summed with the positive phase in graph 54. The angle summation of positive and negative phase is calculated and divided by 2, resulting in the initial phase. In parallel to the process of graphs 51 to 54, the receiver shifts the received phases of graphs 11 and 22 by adding 70° to both phases as illustrated in graphs 61 and 62, respectively, and by subtracting 70° from both phases, as illustrated in graphs 81 and 82, respectively. Once adding 70° as illustrated in graphs 61 and 62, respectively, the receiver inverses the original negative phase as illustrated in graph 63. The shifted inversed negative phase, illustrated in graph 63, is thus summed with the shifted positive phase illustrated in graph 61 and divided by 2, thereby forming the original phase as illustrated in graph 64. The parallel subtracted angles illustrated in graphs 81 and 82 are processed similarly. Once subtracting 70°, as illustrated in graphs 81 and 82, respectively, the receiver inverses the original negative phase as illustrated in graph 83. The shifted inversed negative phase illustrated in graph 83 is thus summed with the shifted positive phase illustrated in graph 81 and divided by 2, thereby forming the original phase, as illustrated in graph 84. All 3 resulting phases illustrated in graphs 54, 64, and 84 are compared for equality; if all 3 phases are the same, no deduction from the received phase is necessary.

On the other hand, In FIG. 9b an incident is introduced where Δ>20° and therefore Δ+70°>90°. As described above, graphs 51 and 52 illustrate two received phases with a phase shift identical to graphs 11 and 22 respectively. The negative phase signal of graph 52 is inversed in the receiver, thereby forming graph 53, and summed with the positive phase in graph 54. The angle summation of positive and negative phase is calculated and divided by 2, resulting in the initial phase, as illustrated in graph 54. In parallel to the process of graphs 51 to 54 described above, the receiver shifts the received phases of graphs 11 and 12 by adding 70° to both phases as illustrated in graphs 91 and 92 respectively and by subtracting 70° to both phases, as illustrated in graphs 81 and 82, respectively. However, after adding 70°, as illustrated in graphs 91 and 92, respectively, and after the receiver inverses the original negative phase, as illustrated in graph 93, the summation of shifted inversed negative phase illustrated in graph 93 and shifted positive phase, illustrated in graph 91, and division by 2 forms a phase different from the original phase, as illustrated in graph 94. The parallel subtracted phase, illustrated in graphs 81 and 82 are processed similarly. Once subtracting 70° as illustrated in graphs 81 and 82 respectively the receiver inverses the original negative phase as illustrated in graph 83. The shifted inversed negative phase illustrated in graph 63 is thus summed with the shifted positive phase illustrated in graph 81 and divided by 2, forming the original phase as illustrated in graph 84. All 3 resulting phases illustrated in graphs 54, 94, and 84 are compared for equality. Since the adding of 70° forms a result with a different phase, as illustrated in graph 94, from the other 2 phases illustrated in graphs 54 and 84, the deduction of 20° from the phase of received signals is necessary. As understood, if the subtraction of 70° forms a different phase from the other two resulting phases, than an addition of 20° to the phase of received signals is necessary.

Since Walsh signals of any order have an equal number of positive and negative phases, the calculations of the total summation are essentially the same as described.

Guard Interval

Guard interval is a technique of which purpose is to eliminate transient effects of communicating signals. During the guard interval the receiver does not process the transmitted signal. This technique will not be further discussed, as it is well known in the art of wireless communication systems, such as Digital Audio Broadcasting (DAB) and Digital Video Broadcasting (DVB-T) terrestrial systems that use OFDM techniques.

The decision whether guard intervals should be used in the invention depends on the signal's delay and the symbol(s) duration. If the signal's delay is Δt and the symbol duration is $T_s$, the duration of the guard interval $\Delta t_g$ must comply with the rule $\Delta t < \Delta t_g < (0.1 \div 0.25) * T_s$.

According to the present invention, if the signal's delay is long in comparison to the symbol duration, the symbol transmission rate is reduced to allow a longer symbol duration, into which a guard interval of adequate duration can be affiliated.

Modulation Techniques

Figure 10:
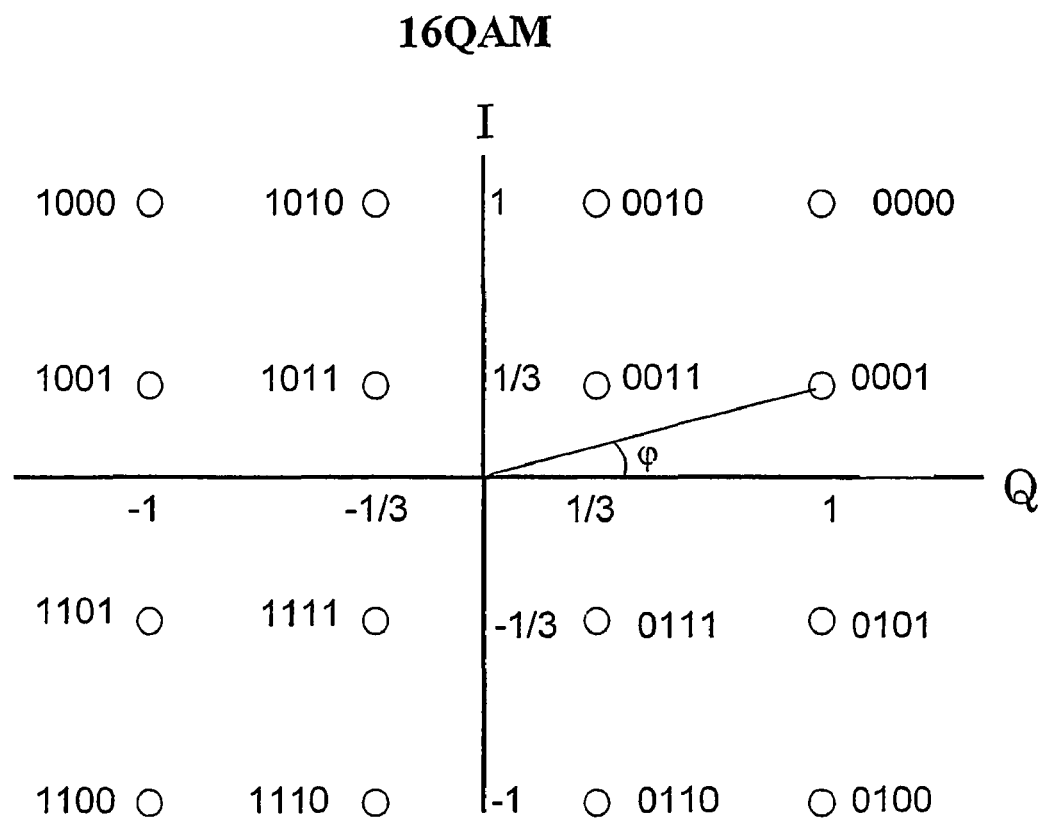
FIG. 10 schematically illustrates a 16 QAM modulation technique.

One of the advantages of FBS-2 over FBS-1 is the ability to use modulation techniques that are both amplitude and phase coded, such as QAM. An example of 16-QAM is illustrated in FIG. 10 and will not be discussed here as QAM and other similar modulation techniques that use the coding of amplitude and phase are widely described and discussed in the professional literature. However, it should be noted that these modulation techniques are able to transmit more information on the allocated frequencies. For comparison, an example is discussed where the FBSA uses m carriers for transmitting m signals. Since FBS-2 utilizes I carriers and Q carriers only m/2 signals may be transmitted on the same allocated channels. Nevertheless, the QAM modulation technique, used in FBS-2, allows transmitting twice as much data as the PSK modulation technique, used in FBS-1, for the same allocated channels.

It is well-known that for transmitting signal with 16QAM the signal should be larger by at least 4 dB. In case of FBS-2, we have an increasing effective power of the signal in the detector. It is well known that if the same signal is transmitted in neighboring frequency band, the summing amplitude will be like a arithmetical sum, but the noise is summing like mean-square value. That is, the signal to noise ratio increases. In case of FBS-2 with m=8 we have two identical sub signals and other pairs have are correlated. It is possible to show, that the level of effective power in detector is increased by more than 3 dB. The results are shown in Simulation Results, described below.

Figure 11:
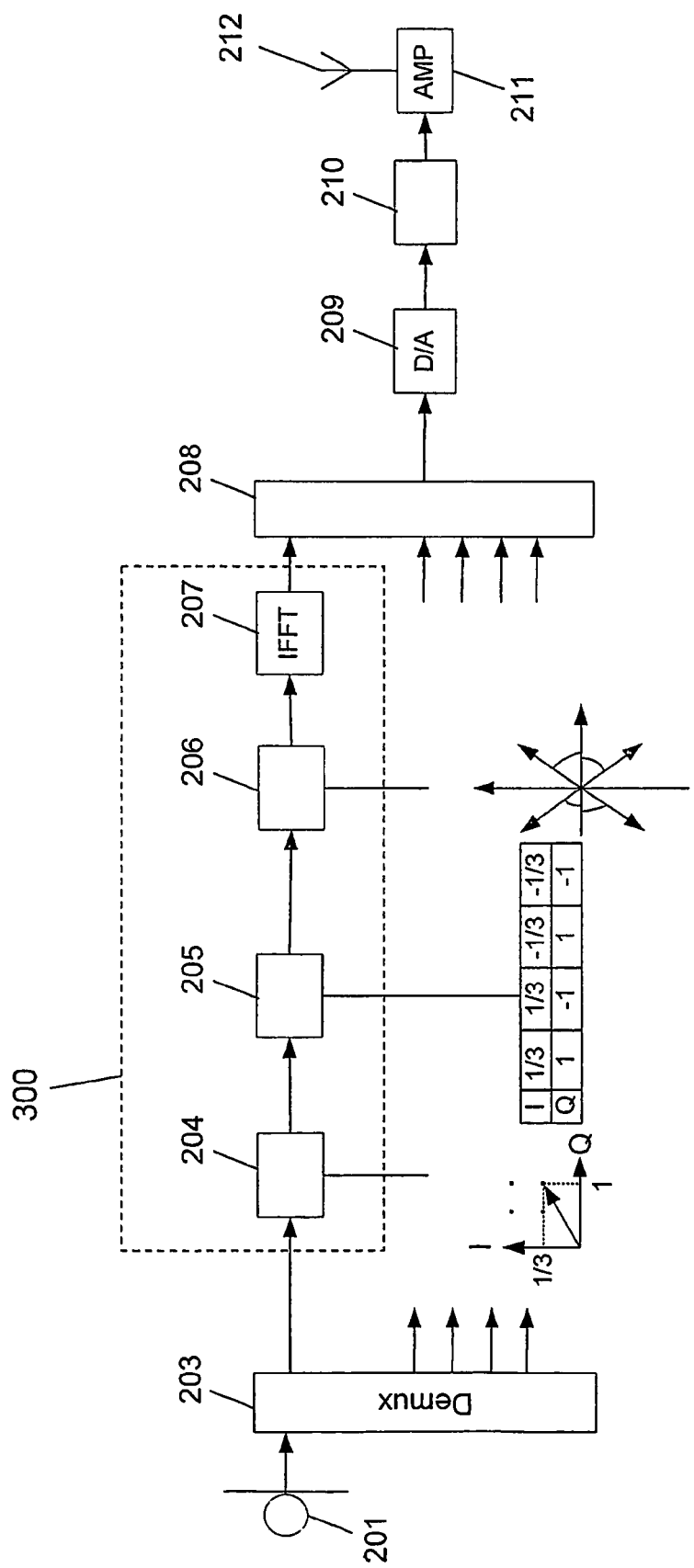
FIG. 11 is a block diagram of a transmitting module, according to an embodiment of the invention.

Theoretical calculations may be found in textbook Digital communication systems design by Roden Martin S, Prentice Hall, NJ, 1988, FIG. 11.5, where it is shown that it is possible to double the signal power.

System Components

FIG. 11 illustrates a block diagram of a transmitter, according to an embodiment of the invention. Block 201 represents a source of digital signal bits entering demultiplexer 203, which has a number of outputs. Each output of demultiplexer 203 is connected to a DSP module. For the sake of brevity only one DSP module 300, which is connected to the first output of demultiplexer 203, is described, all other DSP modules perform similarly. The first element 204 of DSP module 300, receives the incoming bits and converts them to a QAM signal. For example, using the 16-QAM modulation technique, a bit sequence of 0001 is converted to a signal comprising I=⅓ Q=1 (as illustrated in FIG. 10). In element 205 the received signal is multiplied by the designated Walsh functions for I and Q. Continuing the previous example, if for instance the designated Walsh functions are:

1 1 −1 −1
1 −1 1 −1 for I and Q respectively, 4 couples of signals are formed which are:

| ⅓ | ⅓ | −⅓ | −⅓ |
|---|---|----|----|
| 1 | −1 | 1 | −1 |

In element 206 each pair from element 205 is calculated for phase and amplitude. In element 207 an Inverse Fast Fourier Transform (IFFT) is applied to transform the signals to the time domain using any type of 'frequency-domain' to 'time-domain' transformation. In Summator 208 all the signals from the DSP modules are summed and sent to D/A element 209 which transforms the digital signals into analog signals. The analog signals carried by the sub-carriers, are 'up-shifted' in frequency by element 210 from Intermediate Frequency to the final/transmitted frequency. The signal with the transmitted frequency is then amplified by Amplifier 211, and transmitted by antenna 212.

Figure 12:
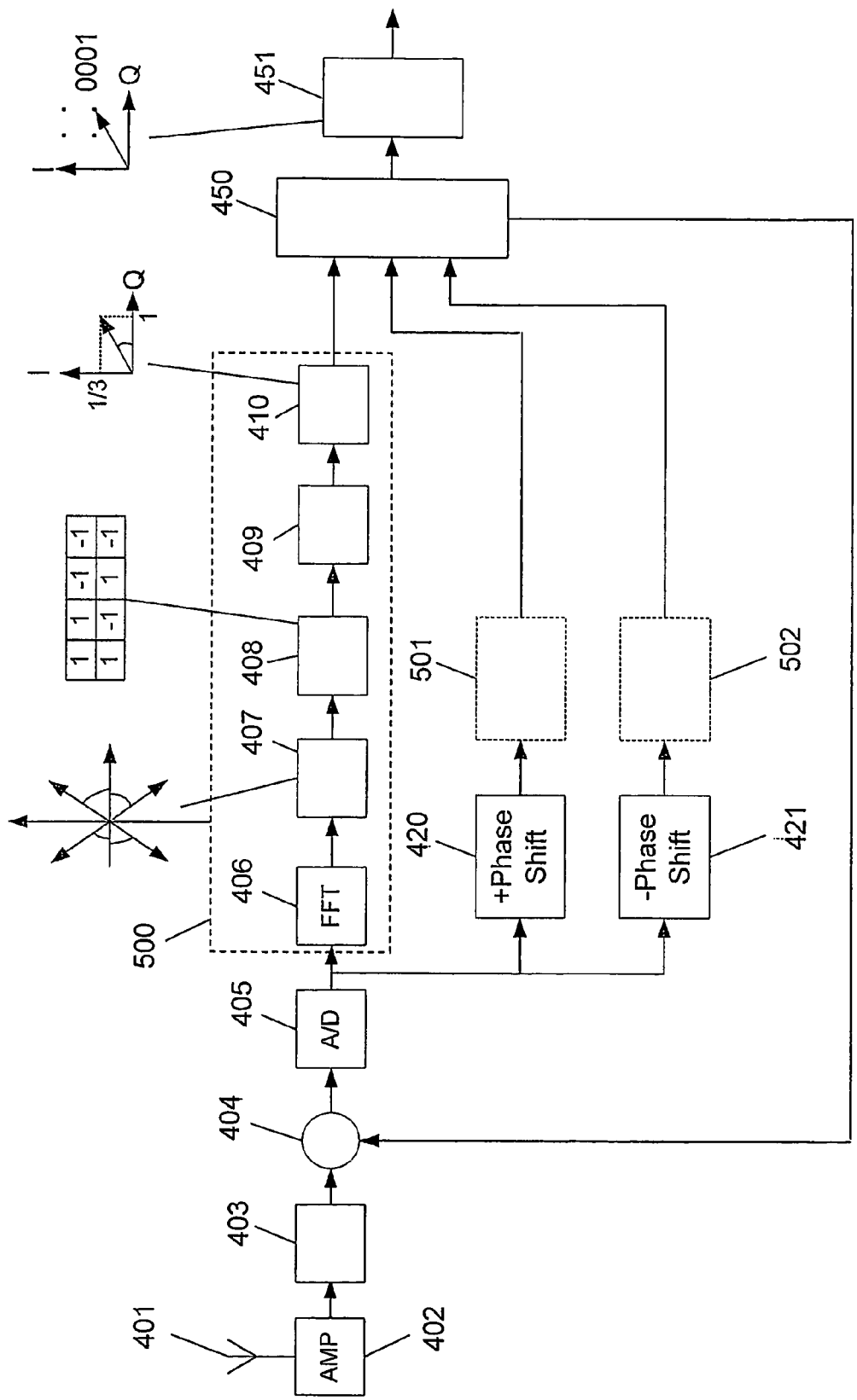
FIG. 12 is a block diagram of a receiving module, according to an embodiment of the invention.

FIG. 12 illustrates a block diagram of a receiver, according to an embodiment of the invention. Antenna 401 receives the transmitted signals and amplifier 402 amplifies the signals. Element 403 'down-shifts' the signals from the transmitted frequency to Intermediate frequency. Element 404 compensates the phase shift of the received signal, when needed, and A/D 405 transforms the analog signal into a digital signal for further processing. From A/D 405 the same digital signal is sent to DSP 500, block 420, and block 421. In element 406, which is the first element of DSP module 500, a Fast Fourier Transform (FFT) is applied for transforming the signals to the frequency domain using any type of 'time-domain' to 'frequency-domain' transformation. Element 407 separates the signals carried by the sub-carriers, where element 408 multiplies the signals with their corresponding Walsh functions, as described above. In other words, each signal may have its I factor inversed, its Q factor inversed, both factor inversed, or none of its factors inversed in accordance with the designated Walsh functions. Element 409 adds all the factors received from element 408, I factors and Q factors separately, and divides both by m. The resulting I and Q factors are combined by element 410 for determining the corresponding phase and amplitude of the received signal. The received signal with the phase and amplitude is thus sent to comparator 450.

In block 420 the phase of the received signal is shifted clockwise in a predetermined angle, after which the signal is processed in DSP 501 which functions in a similar manner as DSP 500 described above. Block 421, on the other hand, shifts the phase of the received signal counter-clockwise before DSP 502 processes the signal in the similar manner of DSP 500 and DSP 501.

Comparator 450 compares these three processed signals for equality. If one of the processed signals varies from the other two, necessarily the received signal phase has shifted more than the determined threshold, as described in detail in paragraph "compensation for phase shifts". Comparator 450, may in return use the compensator 404 to deduce or add a phase shift to the incoming signal. In block 451 the signal is interpreted into data bits.

For the sake of brevity the diagrams do not show filters, local oscillators, AGC, regular units, and other required components known in the art.

It should be noted, that the method proposed by the present invention can be advantageously utilized by many wireless systems such as cellular phone communication, local radio and terrestrial broadcast systems.

Figure 13A:
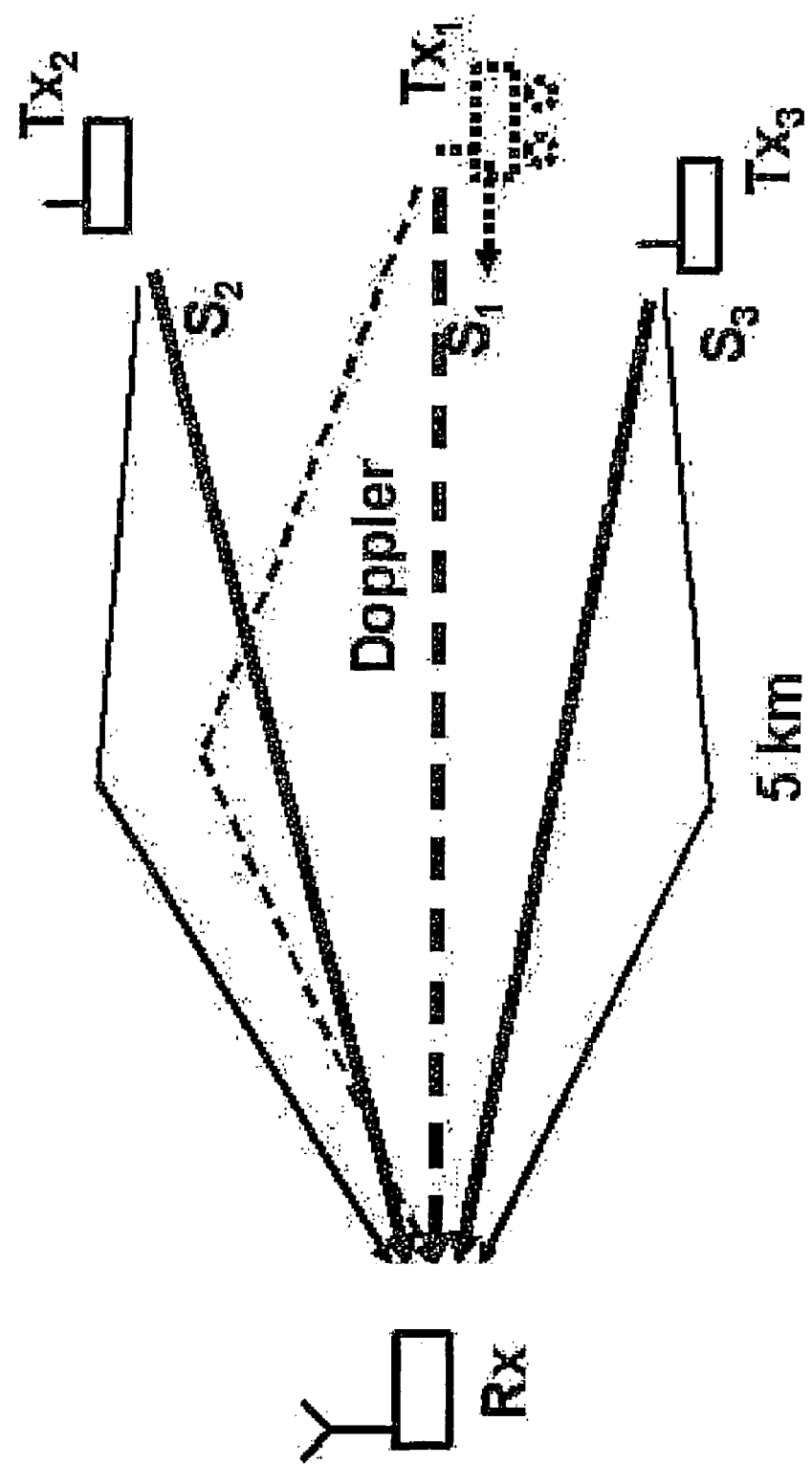
FIGS. 13A to 13C schematically illustrate simulated results of using FSB-2 that correspond to a critical situation, according to a preferred embodiment of the invention.
Figure 13B:
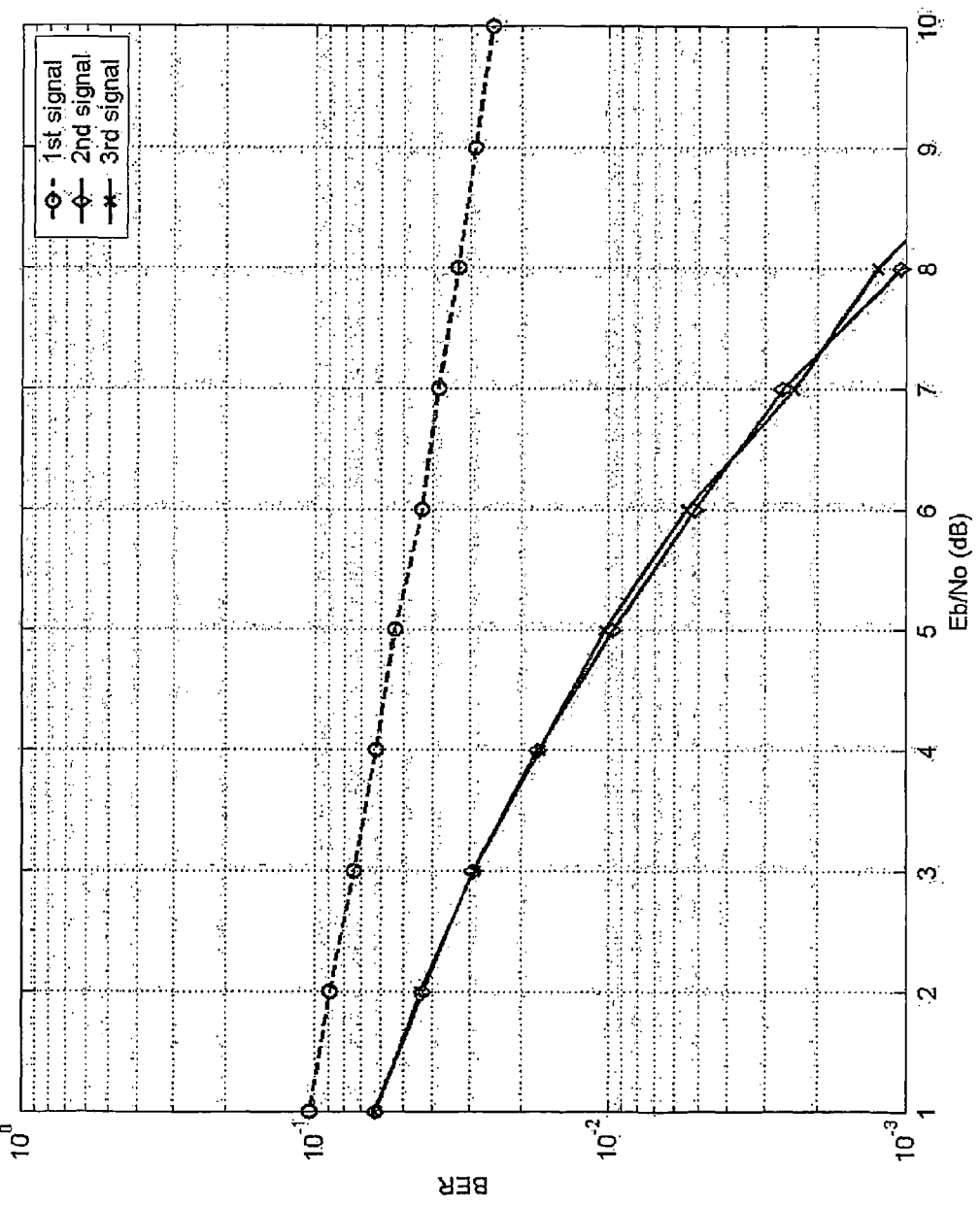
Figure 13C:
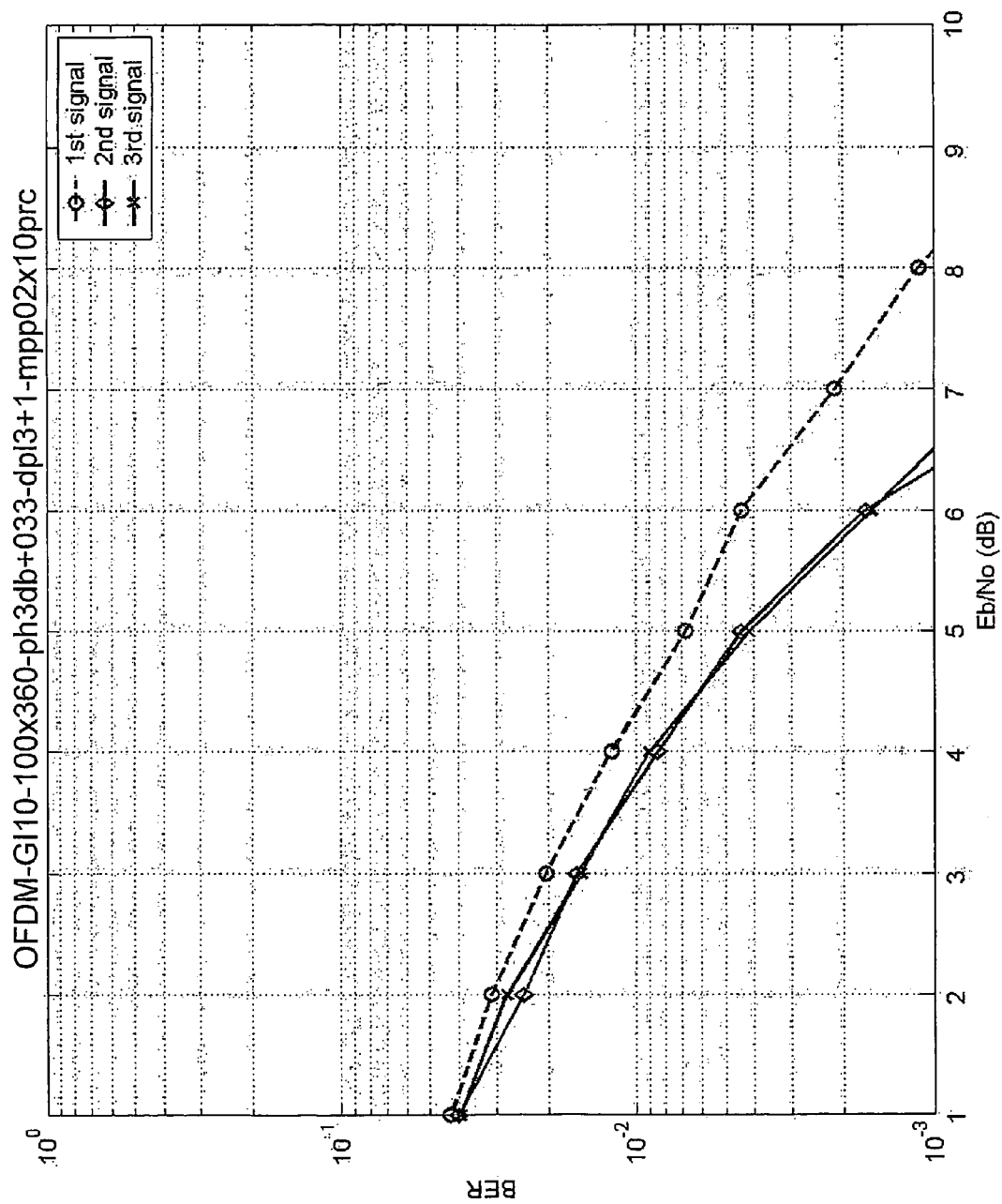

FIGS. 13A to 13C schematically illustrate simulated results that correspond to a critical situation. Looking first at FIG. 13A, a receiver Rx is situated in the center of 10 km diameter zone (a cell). Receiver Rx receives signals from three transmitters, Tx1, Tx2 and Tx3, located on the zone border.

Transmitter Tx1 moves toward (nears) with speed of 120 km/hour. Assuming that a reflected signal with maximal delay has to pass an additional way of 5 km, the maximal delay equals T=10 μs.

If a symbol duration of 100 μs is selected, the frequency difference between sub carriers will be $\Delta f = 1/T = 10$ kHz. The first moving transmitter Tx1 causes a phase shift and a Doppler shift. If the central carrier frequency is 1.0 GHz, the phase shift per one symbol time due to delay will be 3.6°. The Doppler shift caused by these conditions can be 1% of $\Delta f$. FBS-2 modulation is 16QAM. OFDMA signal (six carriers with QPSK) is transmitted with a test signal ($E_b/N_0 = 14$ dB, redundancy is 5%).

FIG. 13B shows simulation results in case of OFDMA. The figure shows that it is impossible to receive signal S1 in these conditions (BER>$10^{-2}$). Due to orthogonality, disturbing signals S2 and S3, the receiving quality is deteriorated as well.

FIG. 13B shows simulation results in case of FBS-2. The figure illustrates that that Doppler shift, Multi-path propagation and Time shift do not affect all signals receiving quality, without using a pilot signal, without equalizing process or differential modulation.

In case of receiving full FBS-05 signal for eliminating long time selective fading we can shift the frequencies of the transmitting signals by ≈±(1÷3) %. In this case, fading will be located in separate, parted by time symbols. For the receiver, this process will be like Doppler shift that it can not influence.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for canceling a Doppler shift, multi-path propagation, delays, and long time selective fading influences of phase and/or amplitude modulated signals carried by Radio Frequency (RF) sub-carriers, without requirement of pilot signals, comprising:
   a) determining the number of $m=2^n$ ($n=1, 2, \ldots,$) orthogonal sub-carriers $f_1, f_2, \ldots, f_m$, over which individual datum is transmitted in each communication channel;
   b) selecting pairs of Walsh functions from an m×m Walsh-Hadamard matrix, wherein each function is not selected more than once;
   c) partitioning each said signal to its I factor and Q factor whereas $I=A \sin \phi$ of said signal and whereas $Q = A \cos \phi$ of said signal, and coding each said I and Q factors of said signals by said pair functions;
   d) for each sub-carrier $f_i$ ($i=1, 2, \ldots, m$), allocating a corresponding phase $\phi_i$ and amplitude $A_i$, wherein the value of $\phi_i$ and the value of $A_i$ are determined by the data that is transmitted, a digital modulation scheme or inverse spectral transformation, and signs of both corresponding elements taken from said pair Walsh functions;
   e) transmitting data with said corresponding phases and amplitudes over said sub-carriers;
   f) receiving all transmissions carried by said sub-carriers and obtaining the corresponding phases and amplitudes of all the received signals at frequency $f_i$ using spectral transformation;
   g) decoding said received signals by changing signs of I and Q factors of said received signals in accordance with corresponding elements from said pair functions used to decode said signals;
   h) separately summing the I and Q factors of received signals after changing signs of said I and Q factors of received signals, and dividing each of the summations of I and Q factors by m; and
   i) reconstructing said signal, using said divided I and Q factors, by calculating its phase whereas $$\varphi = \text{arc} tg \frac{I}{Q}$$

and calculating its amplitude whereas $A = \sqrt{I^2 + Q^2}$.

2. A method according to claim 1, further comprising:
   j) adding predetermined phase to the received signals for shifting the phase and performing the following steps:
   I. decoding said received signals by changing signs of I and Q factors of said received signals in accordance with corresponding elements from the pair functions used to decode said signals;
   II. summing separately said I and Q factors of received signals after changing signs of said I and Q factors of said received signals, and dividing the summation of I and Q factors each by m;
   III. obtaining signal, using said divided I and Q factors, by calculating its phase whereas $$\varphi = \text{arc} tg \frac{I}{Q}$$

and calculating its amplitude whereas $A = \sqrt{I^2 + Q^2}$;
   k) subtracting said predetermined phase from the received signals and comprising said steps I to III;
   l) comparing results of said signal obtained in claim 1 and from said adding and said subtracting; and
   m) adding or subtracting phase from said received signals, if necessary, in accordance with said comparison.

3. A method according to claim 1, wherein each selected pair of Walsh functions add to a symmetric function.

4. A method according to claim 1, wherein the modulated signals are phase and amplitude modulated and the modulation method is QAM.

5. A method according to claim 1, wherein the modulated signals are phase modulated, and the modulation method is selected from the group of: BPSK, DBPSK, QPSK, DQPSK, MSK, MPSK, DMPSK.

6. A method according to claim 1, wherein the modulated signals are amplitude modulated and the modulation method is ASK.

7. A method according to claims 1, further comprising adding guard interval to each symbol before transmission of said symbol, for reducing the effect of transient interference in the receiver.

8. A method according to claim 1, further comprising identifying and removing guard interval from each symbol.

9. A method according to claim 1, wherein the transmitter and receiver can each be stationary or mobile.

10. A method according to claim 1, wherein the all sub-carrier frequencies of the transmitting signals are shifting randomly.

* * * * *